US011452305B2

(12) United States Patent
Carpio et al.

(10) Patent No.: US 11,452,305 B2
(45) Date of Patent: Sep. 27, 2022

(54) METHODS AND SYSTEMS FOR PROCESSING A HIGH-CONCENTRATION PROTEIN PRODUCT FROM A MICROCROP AND COMPOSITIONS THEREOF

(71) Applicant: PARABEL LTD., Melbourne, FL (US)

(72) Inventors: Valentina Carpio, Abu Dhabi (AE); Girish Kasat, Melbourne, FL (US); Ebenezer Ifeduba, Palm Bay, FL (US); Jaouad Fichtali, Melbourne, FL (US)

(73) Assignee: Lemnature AquaFars Corporation, Vero Beach, FL (US)

( * ) Notice: Subject to any disclaimer, the term of this patent is extended or adjusted under 35 U.S.C. 154(b) by 81 days.

(21) Appl. No.: 15/263,253

(22) Filed: Sep. 12, 2016

(65) Prior Publication Data

US 2017/0071239 A1    Mar. 16, 2017

Related U.S. Application Data

(60) Provisional application No. 62/216,975, filed on Sep. 10, 2015.

(51) Int. Cl.
*A23L 17/60* (2016.01)
*A23J 1/00* (2006.01)
(Continued)

(52) U.S. Cl.
CPC .............. *A23L 17/60* (2016.08); *A23J 1/00* (2013.01); *A23J 1/006* (2013.01); *A23J 3/14* (2013.01); *A23K 10/30* (2016.05); *A23V 2002/00* (2013.01)

(58) Field of Classification Search
CPC ..... A23J 3/14; A23J 1/00; A23J 1/006; A23V 2002/00; A23K 10/30; A23K 1/14; A23L 17/006; A23N 12/04; C07K 1/14
See application file for complete search history.

(56) References Cited

U.S. PATENT DOCUMENTS 2,522,513 A    9/1950 Hemmeter
2,692,200 A    10/1954 Olson
(Continued)

FOREIGN PATENT DOCUMENTS

CN    101116986    *   2/2008    ............... A23K 1/14
CN    101370574 A    2/2009
(Continued)

OTHER PUBLICATIONS

Abstract of CN 101116986 Feb. 6, 2008.*
(Continued)

*Primary Examiner* — Jenna A Watts
(74) *Attorney, Agent, or Firm* — Baker & McKenzie LLP

(57) ABSTRACT

The present disclosure relates, according to some embodiments, to methods and systems for processing a high-concentration protein product from a microcrop (e.g., aquatic species, *Lemna*) and compositions thereof. According to some embodiments, the present disclosure relates to a method of processing a biomass comprising a microcrop (e.g., *Lemna*), where the method may include: blanching a first portion of the biomass in a blanching solution to form a wet protein concentrate; separating the first wet protein concentrate from a separated solution (e.g., using a screw press, using a vibratory screen); and drying the first wet protein concentrate to form at least one of a first protein concentrate flake and a first protein concentrate granule. In some embodiments at least one of the first protein concentrate flake and the first protein concentrate granule may comprise at least 45% protein and a Protein Digestibility Corrected Amino Acid Score (PDCAAS) value of at least 0.88. In some embodiments, the present disclosure relates to protein products and compositions derived from a microcrop (e.g., derived from *Lemna*).

41 Claims, 8 Drawing Sheets

(51) Int. Cl.
*A23K 10/30* (2016.01)
*A23J 3/14* (2006.01)

(56) References Cited

U.S. PATENT DOCUMENTS

| | | | |
|---|---|---|---|
| 2,827,454 | A | 3/1958 | Nord |
| 2,867,945 | A | 1/1959 | Gotaas et al. |
| 3,468,057 | A | 9/1969 | Buisson et al. |
| 3,499,687 | A | 3/1970 | Ellis |
| 3,674,501 | A | 7/1972 | Betz et al. |
| 3,704,041 | A | 11/1972 | Loveland et al. |
| 3,768,200 | A | 10/1973 | Klock |
| 3,839,198 | A | 10/1974 | Shelef |
| 3,930,450 | A | 1/1976 | Symons |
| 3,955,318 | A | 5/1976 | Hulls |
| 4,005,546 | A | 2/1977 | Oswald |
| 4,041,640 | A | 8/1977 | Itanami et al. |
| 4,042,367 | A | 8/1977 | Wilson |
| 4,066,633 | A | 1/1978 | Gastineau et al. |
| 4,077,158 | A | 3/1978 | England |
| 4,137,868 | A | 2/1979 | Pryor |
| 4,253,271 | A | 3/1981 | Raymond |
| 4,429,867 | A | 2/1984 | Barber |
| 4,516,528 | A | 3/1985 | Jones |
| 4,557,937 | A | 12/1985 | Bournier |
| 4,560,032 | A | 12/1985 | Imanaka |
| 4,604,948 | A | 8/1986 | Goldhahn |
| 4,840,253 | A | 6/1989 | DiMaggio et al. |
| 4,910,912 | A | 3/1990 | Lowrey, III |
| 5,047,332 | A | 9/1991 | Chahal |
| 5,121,708 | A | 6/1992 | Nuttle |
| 5,171,592 | A | 12/1992 | Holtzappie et al. |
| 5,269,819 | A | 12/1993 | Porath |
| 5,527,456 | A | 6/1996 | Jensen |
| 5,659,977 | A | 8/1997 | Jensen et al. |
| 5,667,445 | A | 9/1997 | Lochtefeld |
| 5,704,733 | A | 1/1998 | de Greef |
| 5,941,165 | A | 8/1999 | Butte |
| 6,077,548 | A | 6/2000 | Lasseur et al. |
| 6,096,546 | A | 8/2000 | Raskin |
| 6,251,643 | B1 | 6/2001 | Hansen et al. |
| 6,348,347 | B1 | 2/2002 | Hirabayashi et al. |
| 7,058,197 | B1 | 6/2006 | McGuire et al. |
| 7,215,420 | B2 | 5/2007 | Gellerman et al. |
| 7,674,077 | B2 | 3/2010 | Opatril |
| 8,245,440 | B2 | 8/2012 | Ryan et al. |
| 8,287,740 | B2 | 10/2012 | Newman et al. |
| 8,722,878 | B2 | 5/2014 | Raines et al. |
| 9,675,054 | B2 | 6/2017 | Grajcar et al. |
| 2004/0030516 | A1 | 2/2004 | Dunhill et al. |
| 2004/0144025 | A1 | 7/2004 | Rutzke |
| 2006/0024689 | A1 | 2/2006 | Bleuart et al. |
| 2007/0048859 | A1 | 3/2007 | Sears |
| 2007/0151522 | A1 | 7/2007 | Brauman |
| 2008/0034349 | A1 | 2/2008 | Visckov et al. |
| 2008/0096267 | A1 | 4/2008 | Howard et al. |
| 2008/0155890 | A1 | 7/2008 | Oyler |
| 2009/0088757 | A1 | 4/2009 | Tulkis |
| 2009/0151240 | A1 | 6/2009 | Kayama et al. |
| 2009/0285642 | A1 | 11/2009 | De Greef |
| 2010/0028505 | A1 | 2/2010 | Katzke et al. |
| 2010/0041095 | A1 | 2/2010 | Zeikus |
| 2010/0116986 | A1 | 5/2010 | Obuki et al. |
| 2010/0151558 | A1 | 6/2010 | Alianell et al. |
| 2010/0162620 | A1 | 7/2010 | McCaffrey et al. |
| 2010/0281836 | A1 | 11/2010 | Vanhoute et al. |
| 2010/0325948 | A1 | 12/2010 | Parsheh et al. |
| 2011/0016773 | A1 | 1/2011 | Nichols et al. |
| 2011/0092726 | A1 | 4/2011 | Clarke |
| 2011/0172102 | A1 | 7/2011 | Jacob et al. |
| 2012/0009660 | A1 | 1/2012 | Pottathil et al. |
| 2012/0110901 | A1* | 5/2012 | Olivier .................. A23J 1/006 44/605 |
| 2012/0171753 | A1 | 7/2012 | Ivry |
| 2012/0288917 | A1 | 11/2012 | Krenbrink et al. |
| 2012/0308989 | A1 | 12/2012 | Barclay et al. |
| 2013/0023044 | A1 | 1/2013 | Gleason |
| 2013/0183705 | A1 | 7/2013 | Barclay et al. |
| 2013/0192130 | A1 | 8/2013 | Eckelberry |
| 2013/0244309 | A1 | 9/2013 | Singh et al. |
| 2014/0023675 | A1 | 1/2014 | Lina et al. |
| 2014/0212955 | A1 | 7/2014 | Ploechinger |
| 2014/0221630 | A1 | 8/2014 | Olivier et al. |
| 2014/0338261 | A1 | 11/2014 | Sykes |
| 2014/0356496 | A1 | 12/2014 | Mulnyczuk |
| 2015/0072400 | A1 | 3/2015 | Clarke |
| 2015/0275161 | A1 | 10/2015 | Gressel et al. |
| 2016/0030350 | A1 | 2/2016 | Muller |
| 2016/0288001 | A1 | 10/2016 | Johnson |
| 2016/0360715 | A1 | 12/2016 | Sherlock et al. |
| 2017/0223935 | A1 | 8/2017 | Behrens |
| 2018/0014486 | A1 | 1/2018 | Creechley et al. |
| 2018/0118595 | A1 | 5/2018 | Curry |

FOREIGN PATENT DOCUMENTS

| | | | | |
|---|---|---|---|---|
| CN | 101595943 | | 12/2009 | |
| CN | 102448286 | | 5/2012 | |
| CN | 103002752 | A | 3/2013 | |
| CN | 202960947 | | 6/2013 | |
| CN | 202960947 | U | 6/2013 | |
| CN | 104126494 | | 11/2014 | |
| CN | 104126494 | A | 11/2014 | |
| CN | 204092345 | | 1/2015 | |
| CN | 104413257 | * | 3/2015 | ............... A23K 1/14 |
| CN | 104585067 | A | 5/2015 | |
| DE | 4133920 | | 11/1993 | |
| EP | 0285195 | | 10/1988 | |
| EP | 0765599 | | 4/1997 | |
| FR | 2522479 | | 9/1983 | |
| JP | S52151199 | | 12/1977 | |
| JP | 54-73148 | | 6/1979 | |
| JP | S54147650 | | 11/1979 | |
| JP | S56-031425 | | 3/1981 | |
| JP | S59-183635 | A | 10/1984 | |
| JP | 2001-346544 | | 12/2001 | |
| JP | 2002-306147 | A | 10/2002 | |
| JP | 2002-532112 | A | 10/2002 | |
| JP | 2004097021 | | 4/2004 | |
| JP | 2005007837 | | 1/2005 | |
| JP | 2005065626 | A | 3/2005 | |
| JP | 2008-043207 | A | 2/2008 | |
| JP | 2010-214278 | A | 9/2010 | |
| JP | 2011-019508 | A | 2/2011 | |
| JP | 2011254724 | A | 12/2011 | |
| JP | 2013521808 | A | 6/2013 | |
| KR | 20000018164 | U | 10/2000 | |
| KR | 101153379 | | 6/2012 | |
| MX | 2011010995 | | 1/2012 | |
| NL | 20111038645 | | 9/2012 | |
| WO | 9105849 | | 5/1991 | |
| WO | 9818344 | | 5/1998 | |
| WO | 0145523 | | 6/2001 | |
| WO | 2002034755 | | 5/2002 | |
| WO | 03028432 | | 4/2003 | |
| WO | 2007109066 | | 9/2007 | |
| WO | 2007111677 | | 10/2007 | |
| WO | 2008020457 | | 2/2008 | |
| WO | 2008033573 | | 3/2008 | |
| WO | 2010123943 | | 10/2010 | |
| WO | 2010144877 | | 12/2010 | |
| WO | 2011044194 | | 4/2011 | |
| WO | 2011116252 | | 9/2011 | |
| WO | WO2011116252 | | 9/2011 | |
| WO | 2011-156662 | A2 | 12/2011 | |
| WO | 2011156662 | | 12/2011 | |
| WO | 2014046543 | | 3/2014 | |

OTHER PUBLICATIONS

Machine English language translation of CN 101116986 Feb. 6, 2008.*

Abstract of CN 104413257 Mar. 18, 2015.*

(56) References Cited

OTHER PUBLICATIONS

Machine English language translation of CN 104413257 Mar. 18, 2015.*
Goopy et al. "A review on the role of duckweed in nutrient reclamation and as a source of animal feed". Asian-Aust.J. Anim. Sci. 2003, vol. 16, No. 2: 297-305. (Year: 2003).*
International search report and written opinion of the international searching authority for co-pending PCT application No. PCT/US2016/051366 dated Dec. 22, 2016.
Titi Mutiara K. et al., 'Effect of blanching treatments against protein content and amino acid drumstick leaves (Moringa oleifera)', Journal of Food Research, vol. 2, No. 1, pp. 101-108 (2013).
Gertjan Schaafsma, 'Advantages and limitations of the protein digestibility-corrected amino acid score (PDCAAS) as a method for evaluating protein quality in human diets', British Journal of Nutrition, vol. 108, pp. S333-S336 (2012).
International search report and written opinion of the international searching authority for co-pending PCT application No. PCT/US2016/051380 dated Dec. 26, 2016.
International Preliminary Report on Patentability by the International Preliminary Examination Authority (Korean Intellectual Patent Office) for co-pending PCT application No. PCT/US2016/051366 dated Mar. 22, 2018.
International Preliminary Report on Patentability by the International Preliminary Examination Authority (Korean Intellectual Patent Office) for co-pending PCT application No. PCT/US2016/051380 dated Mar. 22, 2018.
Examination Report, mailed in related Chinese Patent Application No. 201080023569.X, dated Sep. 20, 2012.
Office Action, mailed in Brazilian Patent Application No. PI1015000-5, notification published Jan. 23, 2018.
Office Action mailed in Brazilian Patent Application No. PI1015000-5, dated Dec. 20, 2017.
International Search Report and Written Opinion of the International Searching Authority (US) in related International Application No. PCT/US2010/031811, dated Jun. 18, 2010.
International Preliminary Report on Patentability of the International Preliminary Examination Authority (US) in related International Application No. PCT/US2010/031811, dated Oct. 11, 2011.
Office Action received in Brazilian Patent Application No. PI1015000-5, notification published May 10, 2018.
Office Action, mailed in Chinese Patent Application No. 201610789415.0 dated Nov. 5, 2018.
International Search Report and Written Opinion of the International Searching Authority (US) in PCT International Application No. PCT/US2011/028911, dated Nov. 30, 2011.
Office Action in Mexican Patent Application No. MX/a/2014/010053, dated Feb. 13, 2017.
Office Action mailed in Malaysian Patent Application No. PI 2011005000 dated Jun. 30, 2015.
Extended Search Report in European Patent Application No. 11757038.2, dated Mar. 9, 2017.
Office Action in European Patent Application No. 11757038.2, dated Jul. 16, 2018.
Office Action in Australian Patent Application No. 2015255285, dated Mar. 3, 2017.
Preliminary Examination Report in Peruvian Patent Application No. 1563-2012, dated Apr. 17, 2017.
International Preliminary Report on Patentability of the International Preliminary Examination Authority in PCT International Application No. PCT/US2011/028911, dated Sep. 18, 2012.
Office Action in Canadian Patent Application No. 2793512, dated Mar. 28, 2018.
Office Action in Canadian Patent Application No. 2793512, dated Aug. 7, 2017.
Office Action in Indonesian Patent Application No. W00201204170, dated Sep. 29, 2017.
Office Action in Japanese Patent Application No. 2015-020932 dated Jan. 27, 2017.
Office Action in Japanese Patent Application No. 2015-020932 dated Dec. 5, 2017.
Office Action in Indian Patent Application No. 8902/DELNP/2012 dated Aug. 3, 2018.
Office Action in European Patent Application No. 11757038.2, dated Jan. 3, 2019.
International Preliminary Report on Patentability by the International Preliminary Examination Authority for International Application No. PCT/US2016/037097, dated Dec. 22, 2017.
International Search Report and Written Opinion of the international Searching Authority for PCT application No. PCT/US2016/037099, dated Oct. 5, 2016.
International Preliminary Report on Patentability by the International Preliminary Examination Authority (Korean Intellectual Patent Office) for International Application No. PCT/US2016/037099, dated Dec. 12, 2017.
Extended Search Report in European Patent Application No. 16808483.8, dated Dec. 21, 2018.
International Preliminary Report on Patentability by the International Preliminary Examination Authority (Korean Intellectual Property Office) for International Application No. PCT/US2016/037046, dated Dec. 12, 2017.
International Preliminary Report on Patentability by the International Preliminary Examination Authority (Korean Intellectual Property Office) for International Application No. PCT/US2016/041156, dated Jan. 18, 2018.
International Search Report and Written Opinion of the International Searching Authority (Korean Intellectual Property Office) for corresponding PCT application No. PCT/US2016/046422, dated Nov. 10, 2016.
International Preliminary Report on Patentability by the International Preliminary Examination Authority (Korean Intellectual Property Office) for International Application No. PCT/US2016/046422, dated Feb. 22, 2018.
International Search Report and Written Opinion of the International Searching Authority (Korean Intellectual Property Office) for International Application No. PCT/US2016/037097, dated Sep. 12, 2016.
Supplementary European Search Report in European Patent Application No. 16808482.0, dated Feb. 21, 2019.
Sogbesan, OA; "Utilization of Treated Duckweed Meal (Lemna pausicostata) as Plant Protein Supplement in African Mud Catfish (Clarlas gariepinus) Juvenile Diets" Fisheries and Aquaculture Journal, vol. 6, Issue 4, ISSN: 2150-3508 FAJ, 2015.
Extended Search Report of European Patent Office in European Patent Application No. 16845295.1, dated Jan. 15, 2019.
Office Action, mailed in Indian Patent Application No. 8948/DELNP/2011 dated Apr. 11, 2018.
Office Action, mailed in Brazilian Patent Application No. PI1015000-5, dated Sep. 26, 2018.
Pedroni et al., A Proposal to Establish International Network on Biofixation of C02 and Greenhouse Gas Abatement with Microalgae, Journal of Energy and Environmental Research, vol. 1, No. 1, Nov. 2001.
Hallam, Murray, Practical Aquaponics for Everyone. Retrieved from Internet: URL: www.aquaponics.net.au/sites1 O.html, Wayback Machine publication dated Dec. 2008, 3 pages.
The Garden Pond Blog. Retrieved from Internet: URL: jeremybiggs.wordpress.eom/2008/10/28/duck-attack/, publication Oct. 2008, 2 pages.
Workshop to produce an Information Kit on Farmer-proven integrated agriculture-aquaculture technologies, IIRR; Retrieved from Internet: collections.infocollections.org/ukedu/en/d/Jii23we/9.1.html, 1992, 10 pages.
Fasakin, E.A. "Nutrient quality of leaf protein concentrates produced from water fern {Azolla africanna Desv) and Duckweed {Spirodela polyrrhiza L. Schleiden)", Bioresource Technology., vol. 69, No. 2, Aug. 1, 1999 {Aug. 1, 1999), pp. 185-187.
Fowden, L. "The Composition of the Bulk Proteins of Chlorella" [online] Published Jun. 20, 1951. Retrieved fromIntemet Jun. 1, 2017:<URL:https://www.ncbi.nlm.nih.gov/pmc/articles/PMC1197660/pdf/biochemj00910-0079.pdf>.

(56) References Cited

OTHER PUBLICATIONS

Bolenz, S. et al. "Treatments of Water Hyacinth Tissue to Obtain Useful Products", Biological Wastes, Amsterdam, NL, vol. 33, No. 4, Jan. 1, 1990 {Jan. 1, 1990), pp. 263-274.
Kindel, Paul K. et al. "Solubilization of pectic polysaccharides from the cell walls of Lemna minor and Apium graveolens", Phytochemistry, vol. 41, No. 3, Feb. 1, 1996 {Feb. 1, 1996), GB, pp. 719-723.
Byers, M. "The Amino Acid Composition of Some Leaf Protein Preparations" in IBP Handbook No. 20, Leaf Protein: Its agronomy, Preparation, Quality and Use. 1971, International Biological Programme pp. 95-115.
Kennedy, David "Leaf Concentrate: A Field Guide for Small Scale Programs". Leaf for Life, 1993.
International Search Report and Written Opinion of the International Searching Authority for PCT application No. PCT/US2016/037046, dated Oct. 27, 2016.
International Search Report and Written Opinion of the International Searching Authority (Korean Intellectual PatentOffice) for International Application No. PCT/US2016/041156, dated Oct. 18, 2016.
Cheng et al., "Growing Duckweed to Recover Nutrients from Wastewaters and for Production of Fuel Ethanol and Animal Feed", Clean, vol. 37, No. 1, pp. 17-26 (2009).
Freidig et al., Variation in Oxalic Acid Content among Commercial Table Beet Cultivars and Related Crops. Journal of the American Society for Horticultural Science, vol. 136, No. 1, pp. 54-60 (2011).
Extended Search Report in European Patent Application No. 16835862.0, dated Nov. 9, 2018.
Mazen Ahmed M.A., "Calcium oxalate formation in Lemna minor: physiological and ultrastructural aspects of high capacity calcium sequestration" New Phytologist vol. 161, pp. 435-448, 2003.
Extended Search Report in European Patent Application No. 16845285.2 dated Jan. 15, 2019.
Watson, Elaine, "Ultra-fast-growing aquatic plant promises year-round supply of sustainable vegetable protein", Jul. 24, 2015, p. 1-4, XP055537613, www.bakeryandsnacks.com, Retrieved from Internet: URL: www.bakeryandsnacks.com/Articlei2015/07/06/Aquatic-plant-promises-year-round-supply-of-sustainable-plant-protein. [Retrieved from Internet on Dec. 21, 2018].
Extended Search Report in European Patent Application No. 16808454.9 dated Feb. 6, 2019.
Kwag, J.H. et al. "Conditions for artificial culture of Lemna Paucicostata and potentiality as an alternative biomass source"; J.Lives.House & Env. 16 (2) pp. 143-152, 2010.
First Examination Report in Australian Patent Application No. 2016276974, dated Apr. 9, 2019.
Partial Supplementary European Search Report in European Patent Application No. 16808454.9 dated Nov. 11, 2018.
Office Action dated Jan. 6, 2020 in Chinese Patent Application No. CN201680047105.X.
Lentein, "Clean. Green. Protein", Retrieved from: https://web.archive.org/web/20150901074209/https://lentein.com, web accessed on Jul. 17, 2020.
Lentein, "Green Protein Powder", Retrieved from: https://web.archive.org/web/20150822012645/https://lentein.com/lentein-plus-powder, web accessed on Jul. 17, 2020.
Office Action, mailed in Japanese Patent Application No. 2018-516396, dated Jun. 2, 2020.
Office Action, mailed in Japanese Patent Application No. 2018-516401, dated Jun. 2, 2020.
Office Action, mailed in Japanese Patent Application No. 2018-532528, dated Jun. 23, 2020.
Office Action dated Jul. 3, 2020 in Chinese Application No. 201680047237.2.
Office Action dated Jul. 9, 2020 in Japanese Application No. 2018-516402.
Office Action dated Aug. 4, 2020 in Japanese Application No. 2018-506982.
Office Action dated Jun. 24, 2020 in European Application No. 16845295.1.
Office Action dated Jun. 23, 2020 in Japanese Application No. 2018-532531.
Annual Review of Plant Biology, 2005, vol. 56, p. 41-71.
Sogbesan et al, "Utilization of Treated Duckweed Meal (*Lemna pausicostata*) as Plant Protein Supplement in African Mud Catfish (*Clarias gariepinus*) Juvenile Diets", Fisheries and Aquaculture Journal, vol. 06, No. 04, Jul. 12, 2015, p. 1-5, XP055535965.
Office Action dated Aug. 21, 2020 in Chinese Application No. 201680065224.8.
Office Action dated Dec. 14, 2020 in Chinese Application No. 201680058494.6.
Office Action dated Sep. 2, 2020 in Chinese Application No. 201680047105.x.
Office Action dated Dec. 3, 2020 in Chinese Application No. 201680047175.5.
Kammerer, Dietmar Rolf, Chapter 11—Resin Adsorption and Ion Exchange to Recover and Fractionate Polyphenols, Polyphenols in Plants, 219-230, (2014).
Office Action dated Nov. 17, 2020 in Brazilian Patent Application No. BR112018004808-9 (agent's reporting letter).
Mazen, Ahmed M. A., et al. Calcium oxalate formation in Lemna minor: physiological and ultrastructural aspects of high capacity calcium sequestration. New Phytologist (2003), 435-448.
Extended European Search Report dated Feb. 26, 2021 in European Patent Application No. 20197495.3.
Office Action dated Nov. 12, 2020 in European Patent Application No. 16808482.0.
Examination Report dated Dec. 7, 2020 in European Patent Application No. 16845285.2.
Stuart L. Cantor: "New Plant Protein Powerhouses Prepared Foods", Sep. 11, 2015, XP055755579.
Titi Mutiara Kirana et al. "Effect of Blanching Treatments Against Protein Content and Amino Acid Drumstrick Leaves (*Moringa oleifera*)", Journal of Food Research, vol. 2, No. 1, Jan. 1, 2013, pp. 101-108, XP055367771.
Examination Report dated Dec. 17, 2020 in Australian Patent Application No. 2016321414.
Office Action dated May 28, 2021 in Australian Patent Application No. 2016276972.
Notice of Acceptance dated May 12, 2021 in Australian Patent Application No. 2016321425.
Office Action dated May 24, 2021 in Australian Patent Application No. 2020201808.
Office Action dated Jun. 18, 2021 in Chinese Patent Application No. 201680065224.8.
Office Action dated Apr. 27, 2021 in Japanese Patent Application No. 2018-532528.
European Search Report in European Patent Application 20211071.4 dated Oct. 1, 2021.
Gonzalez-Perez S et al: "Vegetable Protein Isolates" In: "Handbook of hydrocolloids", Jan. 1, 2009 (Jan. 1, 2009), XP055843364, pp. 1-27.
Zeki Berk: "Chapter 6—Isolated soybean Protein (ISP)", Technology of production of edible flours and protein products from soybeans, FAO Agricultural Services Bulletin No. 97, Jan. 1, 1992 (Jan. 1, 1992), p. 7pp, XP055690151, ISBN: 978-92-5-103118-6 Retrieved from the Internet: URL:http://www.fao.org/3/t0532e/t0532e07.htm [retrieved on Apr. 29, 2020].

\* cited by examiner

METHODS AND SYSTEMS FOR PROCESSING A HIGH-CONCENTRATION PROTEIN PRODUCT FROM A MICROCROP AND COMPOSITIONS THEREOF

CROSS-REFERENCE TO RELATED APPLICATIONS

This application claims priority to the provisional filing U.S. Application No. 62/216,975 filed Sep. 10, 2015, the contents of which are hereby incorporated in their entirety by reference.

FIELD OF THE DISCLOSURE

The present disclosure relates, in some embodiments, to methods and systems for processing a protein product (e.g., a high-concentration protein product) from a microcrop (e.g., aquatic species, *Lemna, Wolffia*) and compositions thereof.

BACKGROUND OF THE DISCLOSURE

An ever-increasing global population continues to fuel a plethora of sustainability concerns including sufficient and affordable access to protein sources for both feed animals and human consumption, particularly in developing nations. While marine protein sources are often utilized in feeds due to their desirable nutritional profile and enhanced palatability, high production costs lead to an increased demand for alternatives. However, many plant species are unsuitable alternatives due to qualities such as inferior amino acid profile, inferior protein quality and/or quantity, inferior digestibility, high fiber content, and/or high oxalic acid content. Additionally, water conservation concerns—particularly in equatorial and arid regions—are a driving factor in identifying suitable alternative species for the production of protein concentrates.

SUMMARY

Accordingly, a need has arisen for improved methods and systems for the production of a protein product (e.g., a high-concentration protein product). Furthermore, a need has arisen for improved methods and systems for the production of a protein product (e.g., a high-concentration protein product) with reduced oxalic acid content. Further, a need has arisen for improved methods and systems for the production of a protein product (e.g., a high-concentration protein product) in a manner requiring decreased water expenditures.

The present disclosure relates, in some embodiments, to methods and systems for processing a protein product (e.g., a high-concentration protein product) from a microcrop (e.g., aquatic species, *Lemna*) and compositions thereof. A method may comprise, for example, blanching a harvested biomass to form a blanched biomass, drying the blanched biomass to form a dried biomass, and milling the dried biomass to form a high-concentration protein product (e.g., a protein concentrate flour, a dry milled protein concentrate).

According to some embodiments, the present disclosure relates to a method of processing a biomass comprising a microcrop, where the method may include: blanching a first portion of the biomass in a blanching solution to form a wet protein concentrate; separating the first wet protein concentrate from a separated solution (e.g., using a screw press, using a vibratory screen); drying the first wet protein concentrate to form at least one of a first protein concentrate flake and a first protein concentrate granule. A microcrop, in some embodiments, may include at least one of *Lemna* and *Wolffia*.

In some embodiments at least one of the first protein concentrate flake and the first protein concentrate granule may comprise at least 45% DMB protein, the protein having a Protein Digestibility Corrected Amino Acid Score (PD-CAAS) value of at least 0.88. In some embodiments, a PDCAAS value may be limited by histidine. According to some embodiments, a method may also include milling at least one of a protein concentrate flake and a protein concentrate granule to form a protein concentrate flour. In some embodiments, a method may include washing a first portion of the biomass with at least one of a first wash solution, a second wash solution, and a third wash solution, where the first wash solution, the second wash solution, and the third wash solution may be independently selected from a water, a recycled fluid, and an ozonated solution.

In some embodiments, a method may be performed where a blanching solution is contacted with a first portion of a biomass at a ratio of the blanching solution to a first portion of a biomass of 7:1 (w/w), or 6:1 (w/w), or 5:1 (w/w), or (4:1 (w/w). Blanching a first portion of a biomass, in some embodiments, may include combining the first portion of the biomass and a blanching solution at a product flow rate ratio of 7:1 (w/w) (blanching solution to biomass). According to some embodiments, blanching a biomass may include exposing the biomass to the blanching solution for less than 1 min. A method, according to some embodiments, may include exposing a biomass to a blanching solution for about 45 sec. In some embodiments, blanching a biomass may include contacting at least one surface of the biomass with a blanching solution. According to some embodiments, blanching a first portion of a biomass may comprise exposing the biomass to a blanching solution for less than 2 min where the blanching solution may have a temperature between about 75° C. and 95° C. A blanching solution, in some embodiments, may include at least one calcium salt. According to some embodiments, a method may include cooling a wet protein concentrate.

According to some embodiments, a method of processing a biomass comprising a microcrop may include solvent extracting a wet protein concentrate. In some embodiments, a wet protein concentrate may be separated from a separated solution using a vibratory screen (e.g., before solvent extraction).

A method of processing a biomass comprising a microcrop may include recycling a separated solution by performing at least one of: diluting the separated solution, filtering the separated solution, and monitoring the separated solution. In some embodiments, a method may include blanching a second portion of a biomass in a blanching solution or a recycled blanching solution to form a second wet protein concentrate; separating the second wet protein concentrate from the separated solution; and drying the second wet protein concentrate to form at least one of a second protein concentrate flake and a second protein concentrate granule. In some embodiments, at least one of a second protein concentrate flake and a second protein concentrate granule may comprise at least 45% DMB protein, the protein having a PDCAAS value of at least 0.88.

The present disclosure further relates, according to some embodiments, to a high-concentration protein product generated by processing a biomass comprising a microcrop (e.g., *Lemna, Wolffia*) where the processing method may include: blanching a first portion of the biomass in a blanching solution to form a wet protein concentrate; separating the first wet protein concentrate from a separated solution; and drying the first wet protein concentrate to form at least one of a first protein concentrate flake and a first protein concentrate granule. In some embodiments, at least one of the first protein concentrate flake and the first protein concentrate granule may comprise at least 45% DMB protein, the protein having a PDCAAS value of at least 0.88. According to some embodiments, a PDCAAS value may be limited by histidine. In some embodiments, at least one of a protein concentrate flake and a protein concentrate granule may be milled to form a protein concentrate flour.

In some embodiments, at least one of a protein concentrate flake and/or a protein concentrate granule may have at least one of the following characteristics: a PDCAAS of at least 0.92, a digestibility of at least 90%, an ash content of less than 10% DMB, a dietary fiber content of at least 30%, an oxalic acid content of less than 1% DMB, a polyphenol content of less of less than 3.2 mg/100 g, a fat content of less than 7%, a water-binding capacity of at least 7 ml/g, and an oil-binding capacity of at least 3 ml/g. In some embodiments, at least one of a protein concentrate flake and a protein concentrate granule may have an oxalic acid content of less than 0.25% DMB, a polyphenol content of less of less than 1.75 mg/100 g, or both.

According to some embodiments, a method of processing a biomass comprising a microcrop may include solvent extracting a wet protein concentrate. In some embodiments, a wet protein concentrate may be separated from a separated solution using a vibratory screen (e.g., before solvent extraction). A high-concentration protein product produced by a method including solvent extraction may generate at least one of a protein concentrate flake and a protein concentrate granule having at least one of the following characteristics: a protein content of at least 50%, a PDCAAS of at least 0.92, a reduced chlorophyll concentration, a digestibility of at least 90%, an ash content of less than 10% DMB, a dietary fiber content of at least 30%, an oxalic acid content of less than 1% DMB, a polyphenol content of less of less than 3.2 mg/100 g, a fat content of less than 5%, a water-binding capacity of at least 7 ml/g, and an oil-binding capacity of at least 3 ml/g. In some embodiments, at least one of the protein concentrate flake and a protein concentrate granule generated by a method including solvent extraction may have an oxalic acid content of less than 0.25% DMB, a polyphenol content of less of less than 1.75 mg/100 g, or both.

Some embodiments of the present disclosure relate to a method of processing a biomass comprising a microcrop where the method includes: blanching the first portion of the biomass in a blanching solution to form a first wet protein concentrate; separating the first wet protein concentrate from a separated solution; milling the first wet protein concentrate to form a first milled wet protein concentrate; and drying the first milled wet protein concentrate to form a first dry milled protein concentrate. In some embodiments, a first dry milled protein concentrate may comprise at least 45% DMB protein, the protein having a PDCAAS value of at least 0.88. According to some embodiments, a PDCAAS value of a first dry milled protein concentrate may be limited by histidine.

In some embodiments, a method of generating a first dry milled protein concentrate may be performed where a ratio of the blanching solution to a first portion of a biomass is 7:1 (w/w), or 6:1 (w/w), or 5:1 (w/w), or (4:1 (w/w). Blanching a first portion of a biomass, in some embodiments, may include combining the first portion of the biomass and a blanching solution at a product flow rate ratio of 7:1.

According to some embodiments, blanching a biomass may include exposing the biomass to the blanching solution for less than 1 min. A method, according to some embodiments, may include exposing a biomass to a blanching solution for about 45 sec. In some embodiments, blanching a biomass may include contacting at least one surface of the biomass with a blanching solution. According to some embodiments, blanching a first portion of a biomass may comprise exposing the biomass to a blanching solution for less than 2 min where the blanching solution may have a temperature between about 75° C. and 95° C. A blanching solution, in some embodiments, may include at least one calcium salt.

According to some embodiments, a method of processing a biomass to generate a first dry milled protein concentrate may include solvent extracting a wet protein concentrate. In some embodiments, a wet protein concentrate may be separated from a separated solution using a vibratory screen (e.g., before solvent extraction).

A method of processing a biomass comprising a microcrop to generate a first dry milled protein concentrate may include recycling a separated solution by performing at least one of: diluting the separated solution, filtering the separated solution, and monitoring the separated solution. In some embodiments, a method may include blanching a second portion of the biomass in a blanching solution or a recycled blanching solution to form a second wet protein concentrate; separating the second wet protein concentrate from the separated solution; milling a second portion of the wet protein concentrate to form a second milled wet protein concentrate; and drying the second milled wet protein concentrate to form a second dry milled protein concentrate. In some embodiments, a second dry milled protein concentrate may comprise at least 45% DMB protein, the protein having a PDCAAS value of at least 0.88.

Further, the present disclosure relates, in some embodiments, to a protein composition comprising at least one high-concentration protein product extracted from a microcrop (e.g., *Lemna, Wolffia*) and at least one medium, where the at least one high-concentration protein product includes at least one of a protein concentrate flake, a protein concentrate granule, a protein concentrate flour, or a dry milled protein concentrate, and comprises at least 45% DMB protein, the protein having a Protein Digestibility Corrected Amino Acid Score (PDCAAS) value of at least 0.88. According to some embodiments, a PDCAAS value may be limited by histidine. A protein composition may be selected from a shake, a smoothie, a nutrition bar, and an animal feed product, in some embodiments.

According to some embodiments, at least one of a protein concentrate flake, a protein concentrate granule, a protein concentrate flour, or a dry milled protein concentrate of a protein composition may have at least one of: a protein content of at least 50%, a PDCAAS of at least 0.92, a reduced chlorophyll concentration, a digestibility of at least 90%, an ash content of less than 10% DMB, a dietary fiber content of at least 30%, an oxalic acid content of less than 1% DMB, a polyphenol content of less of less than 3.2 mg/100 g, a fat content of less than 5%, a water-binding capacity of at least 7 ml/g, and an oil-binding capacity of at least 3 ml/g. In some embodiments, at least one of a protein concentrate flake, a protein concentrate granule, a protein concentrate flour, or a dry milled protein concentrate of a protein composition may further comprise an oxalic acid content of less than 0.25% DMB, a polyphenol content of less of less than 1.75 mg/100 g, or both.

In some embodiments, a protein composition may include at least one additive. An additive may be selected from a sweetener, a hydrocolloidal stabilizer, a flavor, a nutritional component, or any combination thereof, according to some embodiments.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

Some embodiments of the disclosure may be understood by referring, in part, to the present disclosure and the accompanying drawings, wherein.

DETAILED DESCRIPTION

Figure 1A:
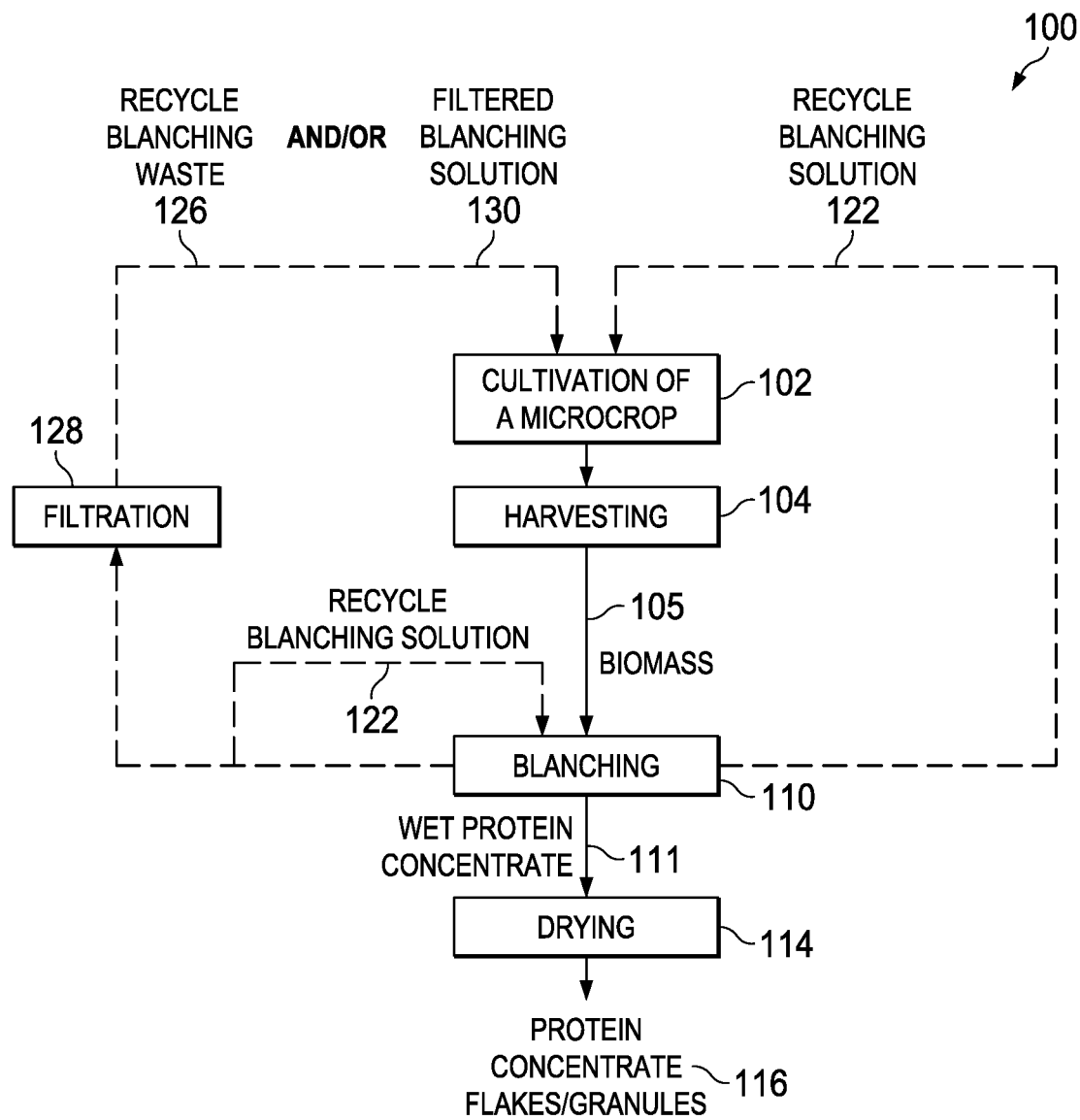
FIG. 1A is a flow diagram illustrating a process for cultivating, harvesting, and processing a microcrop for the production of high-concentration protein product according to a specific example embodiment of the disclosure.

The present disclosure relates, in some embodiments, to a method of processing a biomass comprising a microcrop, the method may include: (a) optionally washing a first portion of the biomass with at least one of a first wash solution, a second wash solution, and a third wash solution, (b) blanching the first portion of the biomass in a blanching solution to form a wet protein concentrate, wherein the blanching solution optionally comprises at least one calcium salt; (c) optionally cooling the wet protein concentrate; (d) optionally filtering a blanching solution to form a filtered blanching solution and a blanching waste; (e) if (d) is included, optionally recycling at least one of the filtered blanching solution and the blanching waste; (f) optionally extracting the wet protein concentrate with a solvent solution; (g) if (f) is included, optionally recovering a solvent and a byproduct from the solvent solution, wherein the byproduct comprises at least one of a chlorophyll byproduct and a fat byproduct; (h) optionally milling a first portion of the wet protein concentrate to form a milled wet protein concentrate; (i) if (h) is included, drying the milled wet protein concentrate to form a dry milled protein concentrate; (j) drying a second portion of the wet protein concentrate to form a protein concentrate flake; and/or (k) milling the protein concentrate flake to form a protein concentrate flour. According to some embodiments, at least one of the protein concentrate flour and the dry milled protein concentrate may comprise: (i) at least 40% protein dry mass basis (DMB), (ii) at least 5% DMB of at least one of an apiogalacturonan and/or an oligogalacturonide, and/or (iii) optionally an oxalic acid content of ≤0.05% DMB. In some embodiments, at least one of the protein concentrate flour and the dry milled protein concentrate may comprise: (i) at least 60% DMB protein, (ii) at least 5% DMB of at least one of an apiogalacturonan and/or an oligogalacturonide, and/or (iii) optionally an oxalic acid content of ≤0.05%. According to some embodiments, at least one of a protein concentrate flour and a dry milled protein concentrate may have reduced chlorophyll (e.g., decolored). In some embodiments, a microcrop may comprise *Lemna*.

Further, the present disclosure relates to a system of processing a biomass comprising a microcrop to generate a high-protein concentrate, the system, in some embodiments, may comprise: (a) optionally a washing unit configured to wash a first portion of the biomass with at least one of a first wash solution, a second wash solution, and a third wash solution, (b) a blanching unit configured to blanch the first portion of the biomass in a blanching solution to form a wet protein concentrate; (c) a first separation unit configured to separate the blanching solution from the wet protein concentrate; (d) optionally a cooling unit configured to cool the wet protein concentrate; (e) a second separation unit configured to separate the cooling liquid from the wet protein concentrate; (f) optionally a filtering unit configured to separate the blanching solution to form a filtered blanching solution and a blanching waste; (g) optionally a solvent extraction unit configured to extract the wet protein concentrate with a solvent solution; (h) optionally a milling unit configured to mill at least a portion of the wet protein concentrate to form a milled wet protein concentrate; (i) a drying unit configured to dry at least a portion of the wet protein concentrate and/or the milled wet protein concentrate (e.g., to produce a protein concentrate flake), and/or (j) if (h) is excluded, a milling unit configured to mill at least a portion of the dried protein concentrate to form a protein concentrate flour.

Additionally, some embodiments of the present disclosure relate to a composition comprising at least 40% protein, at least 5% DMB of at least one of an apiogalacturonan and/or an oligogalacturonide, and/or optionally an oxalic acid content of ≤0.05%. In some embodiments, a composition may comprise: at least 60% protein, at least 5% DMB of at least one of an apiogalacturonan and/or an oligogalacturonide, and an oxalic acid content of ≤0.05%.

The present disclosure relates, in some embodiments, to methods and systems for processing a high-concentration protein product (e.g., ≥45% DMB,) from a microcrop (e.g., aquatic species, *Lemna, Wolffia*) and compositions thereof. More specifically, the present disclosure relates, in some embodiments, to methods and systems for processing a high-concentration protein product from *Lemna* and/or *Wolffia*. In some embodiments, the present disclosure relates to compositions of a high-concentration microcrop protein product processed from an aquatic species.

The present disclosure relates to compositions, systems, and methods for producing a high-concentration (e.g., ≥45% DMB) protein concentrate (e.g., wet, flakes, granules, flour)

from a microcrop (e.g., aquatic plant species, *Lemna*, *Wolffia*, algal species). For example, a method may comprise cultivating, harvesting, washing, blanching, dewatering, separating, drying, and/or milling a microcrop (e.g., aquatic plant species, *Lemna*, algal species) for the production of a high-concentration (e.g., ≥60% DMB, ≥45% DMB) protein concentrate (e.g., wet, flakes, granules, flour) according to specific example embodiments of the disclosure. A method may be performed, in some embodiments, in a series of steps, one or more of which may be repeated. For example, a method may comprise a single cycle (e.g., no step is repeated) resulting in the production of high-concentration (e.g., ≥45% DMB) protein concentrate (e.g., wet, flakes, granules, flour). In some embodiments, a method may comprise multiple cycles (e.g., first portion, second portion) or a continuous process for the production of high-concentration (e.g., ≥45% DMB) protein concentrate (e.g., wet, flakes, granules, flour) such that products, intermediates and/or byproducts of an earlier cycle of the process may be recycled into one or more subsequent cycles of the process.

Microcrop

In some embodiments, a microcrop may comprise a single aquatic species (e.g., *Lemna* species, *Salvinia* species). A microcrop may include species of *Lemna* (e.g., duckweed), *Spirodela*, *Landoltia*, *Wolfiella*, *Salvinia* (e.g., floating fern), *Wolffia* (e.g., watermeal), *Azolla* (e.g., mosquito fern), *Pistia* (e.g., water lettuce), or any combination thereof. According to some embodiments, a microcrop may be a species of *Lemna*, for example, *Lemna minor*, *Lemna obscura*, *Lemna minuta*, *Lemna gibba*, *Lemna valdiviana*, or *Lemna aequinoctialis*. A microcrop may comprise, according to some embodiments, a combination of two or more aquatic species. In some embodiments, a microcrop may be selected from a local aquatic species based on identified compositional and growth characteristics that have developed within the local environmental conditions. Local species may out-compete other species in open ponds or bioreactors based on their adaptation to the local environmental conditions. A microcrop, in some embodiments, may be adjusted in response to seasonal variations in temperature and light availability.

A microcrop may have characteristics that are advantageous in comparison to other aquatic species (e.g., rapid growth rate; reduced nutritional requirements; ease of harvesting and/or processing; enhanced amino acid profile; enhanced palatability; reduced evapotranspiration rate; increased protein composition).

For example, *Lemna* is a genus of free-floating aquatic plants from the Lemnaceae family (e.g., duckweed) that grow rapidly. *Lemna* protein has an essential amino acid profile that more closely resembles animal protein than most other plant proteins. Table 1 shows a typical essential amino acid compositional profile of *Lemna* protein. Additionally, *Lemna* provides high protein yields, with freshly harvested *Lemna* containing up to about 43% protein by dry weight. Furthermore, compared with most other plants, *Lemna* leaves have a low fiber content (e.g., about 5%-about 15% in dry matter) and are highly digestible, even for monogastric animals. This contrasts with the compositions of many crop species (e.g., soy beans, rice, maize) which have fiber contents of approximately 50% and low digestibility.

TABLE 1

| Essential Amino Acid Profile of *Lemna* Protein | |
| --- | --- |
| Essential Amino Acid | Protein (g/100 g) |
| Lysine | 5.9 |
| Leucine | 9.7 |
| Isoleucine | 5.1 |

TABLE 1-continued

| Essential Amino Acid Profile of *Lemna* Protein | |
| --- | --- |
| Essential Amino Acid | Protein (g/100 g) |
| Methionine | 2.4 |
| Phenylalanine | 6.3 |
| Threonine | 4.4 |
| Tryptophan | 2.0 |
| Valine | 6.3 |
| Histidine | 2.7 |
| Arginine | 6.8 |

Cultivation of a Microcrop

In some embodiments a microcrop may be asexually propagated (e.g., cultivated) by contacting the microcrop with a first medium (e.g., an aqueous nutrient composition, a growth medium) under conditions that permit expansion. A microcrop may be cultivated in a bioreactor system, according to some embodiments. A bioreactor system may contain a first medium (e.g., a growth medium) comprising water and/or a nutrient composition, according to some embodiments. A nutrient composition, in some embodiments, may include at least one of nitrogen, phosphorus, potassium, and calcium. In some embodiments, a first medium may comprise dissolved gaseous oxygen and/or dissolved gaseous carbon dioxide. According to some embodiments, a first medium may be configured to have an increased calcium composition (e.g., an increased calcium growth medium). For example, an increased calcium first medium may comprise a calcium concentration of ≥about 120 parts per million (ppm), or ≥about 115 ppm, or ≥about 110 ppm, or ≥about 105 ppm, or ≥about 100 ppm, or ≥about 95 ppm, or ≥about 90 ppm, or ≥about 85 ppm, or ≥about 80 ppm, or ≥about 75 ppm, or ≥about 70 ppm, or ≥about 65 ppm, or ≥about 60 ppm, or ≥about 55 ppm, or ≥about 50 ppm, or ≥about 45 ppm, or ≥about 40 ppm, or ≥about 35 ppm, or ≥about 30 ppm, or ≥about 25 ppm, or ≥about 20 ppm, where "about" may constitute plus or minus 10%. In some embodiments, an increased calcium first medium may comprise a calcium concentration of about 20 ppm to about 120 ppm, about 25 ppm to about 120 ppm, or about 30 ppm to about 120 ppm, or about 40 ppm to about 120 ppm, or about 50 ppm to about 120 ppm, or about 60 ppm to about 120 ppm, or about 70 ppm to about 120 ppm, or about 80 ppm to about 120 ppm, or about 20 ppm to about 100 ppm, or about 30 ppm to about 100 ppm, or about 40 ppm to about 100 ppm, or about 50 ppm to about 100 ppm, or about 60 ppm to about 100 ppm, or about 70 ppm to about 100 ppm, or about 80 ppm to about 100 ppm. An increased calcium first medium, according to some embodiments, may comprise a calcium concentration of at least about 20 ppm (e.g., ±10%). In some embodiments an increased calcium first medium comprises at least 100 ppm calcium. A bioreactor system may be configured to insert additional nutrients (e.g., nitrogen, phosphorus, potassium, calcium) or gases (e.g., oxygen; carbon dioxide) into the first medium at specified time indicators or in response to sensor readings. In some embodiments, a calcium may comprise calcium, calcium carbonate, calcium oxalate, calcium oxide, calcium citrate, calcium carbide, calcium phosphate, calcium sulfate, calcium chloride, or combinations thereof.

In some embodiments, a first medium may comprise one or more anti-photosynthetic dyes that are configured to attenuate photosynthetically active radiation within the growth medium. The one or more anti-photosynthetic dyes may be added at a sufficient volume or concentration to inhibit growth of at least one other aquatic organism (e.g., submerged aquatic species, phytoplankton, phytoalgae, epiphytic algae), according to some embodiments. An anti-photosynthetic dye may include at least one of (n-ethyl-n-[4-[[4-[ethyl[(3-sulfophenyl)methyl]amino]-phenyl](2-sulfophenyl)-methylene)]2,5-cyclohexadien-1-ylidene]-3-sulfobenzenemethanaminium hydroxide inner salt, disodium salt, (Colour Index Acid Blue 9 (Ref. No. 42090)), trisodium (4E)-5-oxo-1-(4-sulfonatophenyl)-4-[(4-sulfonatophenyl)hydrazono]-3-pyrazolecarboxylate (Colour Index Acid Yellow 23 (Ref. No. 19140)), diazanium; 2-[[4-[ethyl-[(3-sulfonatophenyl)methyl]amino]phenyl]-[4-[ethyl-[(3-sulfonatophenyl) methyl] azaniumylidene] cyclohexa-2,5-dien-1-ylidene] methyl] benzenesulfonate (Colour Index Acid Blue 34 (Ref. No. 42645)); benzyl-[4-[[4-[benzyl(ethyl)amino]phenyl]-(5-hydroxy-2,4-disulfophenyl)methylidene]cyclohexa-2,5-dien-1-ylidene]-ethylazanium (Colour Index Acid Blue 5 (Ref. No. 42052)); disodium-2-(1,3-dioxoinden-2-yl)quinoline-6,8-disulfonate (Colour Index Acid Yellow 3 (Ref. No. 15985)), and a mixture of (n-ethyl-n-[4-[[4-[ethyl[(3-sulfophenyl)methyl]amino]-phenyl](2-sulfophenyl)-methylene)]2,5-cyclohexadien-1-ylidene]-3-sulfobenzenemethanaminium hydroxide inner salt, disodium salt and trisodium (4E)-5-oxo-1-(4-sulfonatophenyl)-4-[(4-sulfonatophenyl)hydrazono]-3-pyrazolecarboxylate (Aquashade®). Other suitable anti-photosynthetic dyes may be found in Tables I and II of U.S. Pat. No. 4,042,367 to Wilson, which is incorporated herein by reference.

A first medium (e.g., an aqueous nutrient composition) may be provided in and/or added to a bioreactor (e.g., a pond) and may be maintained at a desired set-point level (e.g., specific volume), according to some embodiments. A bioreactor system, in some embodiments, may be configured to collect rainfall and/or to intake water from a source of ground, surface, or recycled water (e.g., storm water, recycled water) or any other suitable water source. According to some embodiments, a bioreactor system may further comprise an additional storage container (e.g., container or pond) for excess growth medium.

In some embodiments, one or more smaller bioreactors (e.g., pond) may be designed and sized to adequately serve as "feeder" bioreactors to a larger bioreactor. Smaller bioreactors, in some embodiments, may be first inoculated and grown to high density at which point they may optimally seed a larger bioreactor in a manner that supports faster growth.

In some embodiments, a bioreactor system may comprise a monitoring system. A monitoring system may be configured to display and/or provide one or more user alerts regarding bioreactor condition(s) (e.g., nutrient concentrations, pH, dissolved oxygen levels, growth medium levels, microcrop distribution, flow rate, temperature) and/or adjust operating conditions (e.g., growth medium flow rate and/or timing and/or quantity of nutrient addition; "feeder" microcrop addition, oxygen or carbon dioxide addition), in some embodiments. Adjustments may be made continuously, semi-continuously, periodically, intermittently, as needed, at set or variable times, or any other interval. In some embodiments, adjustments may be selected to optimize growth rates and/or yield of the aquatic species. For example, a microcrop species may be grown in large-scale, open bioreactors with monitoring systems configured to adjust the introduction of materials (e.g., fresh or recycled water, fresh or recycled growth media) based on, for example, exposure to light, which may thereby regulate nutrient consumption rates.

A bioreactor system may comprise, in some embodiments, a single container in which the microcrop may be cultivated. In some embodiments, the bioreactor system may comprise multiple cultivation containers that may be connected, partially connected, or disconnected. A bioreactor (e.g., a pond), in some embodiments, may be an earthen basin with the embankments made of compacted dirt removed from the interior bottom of the bioreactor. According to some embodiments the bioreactor may be an artificial container (e.g., metal, plastic, resin). A bioreactor system may comprise an open bioreactor, a closed bioreactor, a semi-open bioreactor, or any combination thereof. In some embodiments, a bioreactor system may be configured to divide the container(s) into channels or cells. A bioreactor system may be configured to permit a flow of growth medium, in some embodiments. A bioreactor system, in some embodiments, may include a propulsion system (e.g., paddle wheels, bubbling, submerged or surface water jets, submerged mixers) and/or a recirculation system. In some embodiments, a bioreactor system may be configured to adjust the flow rate of a growth medium (e.g., to redistribute nutrient concentrations or microcrop growth patterns).

In some embodiments a bioreactor system may be open (e.g., in a horizontal plane relative to the ground) of a bioreactor container (e.g., serpentine raceway) such that a growth medium contained within the bioreactor container and/or a microcrop growing on a top surface of the growth medium may be exposed to a wind initiating from an exterior of the bioreactor container. A bioreactor system, according to some embodiments, may be partially open (e.g., in a horizontal plane relative to the ground) with at least 90% or at least 80%, or at least 70%, or at least 60%, or at least 50%, or at least 40%, or at least 30%, or at least 20%, or at least 10% of the top surface of the contained culture media being open. A top surface may be open, according to some embodiments, where the surface is substantially free (e.g., free) of any covering or other barrier, where the surface is directly exposed to ambient weather conditions, where there is substantially no membrane, glass, cover or other barrier (whether or not such barrier has pores or apertures) between the surface and the atmosphere, and/or where ambient atmosphere is the only occupant of the space immediately and directly above the surface for a distance of at least about 1 meter above the surface.

A bioreactor system, in some embodiments, may monitor and adjust a thickness and distribution of a microcrop mat. For example, when a microcrop reaches a specified thickness or distribution a bioreactor system may initiate harvest procedures. In some embodiments, a minimum thickness of a microcrop mat may be maintained such that a desired evapotranspiration rate of a growth medium within a bioreactor system may be maintained. A minimum thickness of a microcrop may be maintained, in some embodiments, such that less sunlight is capable of penetrating a surface of a growth medium (i.e., reducing a growth potential of submerged aquatic species such as algae).

A microcrop may be cultivated by any suitable method and is not limited to the method described herein. Various changes may be made in the method of cultivation of a microcrop without departing from the scope of the instant disclosure.

Harvesting of a Microcrop

A microcrop may be harvested in whole or in part at any desired time(s) to form a biomass. For example, a microcrop may be harvested at one or more specific times, at regular or irregular intervals and/or continuously. Selection of harvest time(s) and/or intervals may be based on environmental conditions (e.g., precipitation, relative humidity, temperature range, average, low or high threshold and/or light intensity, wavelength range, duration of exposure) and/or the microcrop exhibiting one or more desired characteristics (e.g., mat thickness, mat distribution, maturation). Harvesting a microcrop may be manual or automated. In some embodiments, an automated skimmer system may collect a microcrop from a bioreactor system and transfer a harvested microcrop (e.g., via a pumping system) onto an inclined vibrating screen to separate a biomass from growth medium and debris. A microcrop, in some embodiments, may be harvested by vacuum skimming the microcrop from the bioreactor system through a stationary or mobile screen filter. According to some embodiments, a biomass slurry, including a harvested microcrop (e.g., *Lemna*) and a growth medium (e.g., water), may be conveyed to an inclined vibrating screen where a biomass (e.g., microcrop) may be separated from the growth medium.

During harvesting, a separated growth medium may be recycled back into the bioreactor system or to an additional storage container (e.g., container or pond), according to some embodiments. In some embodiments, at least about 40%, or at least about 50%, or at least about 60%, or at least about 70%, or at least about 80%, or at least about 90%, or at least about 95% of a growth medium (e.g., water) separated from a biomass may be recycled for further use in cultivating, harvesting, and/or processing a microcrop.

Soaking a Biomass and/or Buffering a pH of a Biomass

After harvesting, a biomass may be soaked and/or buffered. Soaking and/or buffering a harvested biomass may contribute to a reduction in an oxalic acid content of a protein product. In some embodiments, soaking and/or buffering a harvested biomass may contribute to a reduction in an oxalic acid and/or oxalate content of a protein product.

In some embodiments, a harvested biomass may be soaked in a second medium. A second medium may comprise water (e.g., ground water, surface water, recycled water), distilled water, reverse osmosis or nanofiltered water, and/or a nutrient composition, according to some embodiments. In some embodiments, a second medium may comprise any desired portion of recycled fluid. For example, a second medium may comprise at least about 10% (v/v), at least about 20% (v/v), at least about 30% (v/v), at least about 40% (v/v), at least about 50% (v/v), at least about 60% (v/v), at least about 70% (v/v), at least about 80% (v/v), or at least about 90% (v/v) recycled fluid from another stage of the process.

According to some embodiments, a second medium may be configured to have a low nitrogen composition (e.g., a low nitrogen second medium). For example, a low nitrogen second medium may comprise a nitrogen concentration of <about 20 parts per million (ppm), <about 18 ppm, <about 16 ppm, or <about 14 ppm, or <about 12 ppm, or <about 10 ppm, or <about 9 ppm, or <about 8 ppm, or <about 7 ppm, or <about 6 ppm, or <about 5 ppm, or <about 4 ppm, or <about 3 ppm, or <about 2 ppm, or <about 1 ppm, or <about 0.5 ppm, or about 0 ppm. In some embodiments, a low nitrogen second medium may comprise a nitrogen concentration of about 0 ppm to about 20 ppm, or about 0.5 ppm to about 20 ppm, or about 0.5 ppm to about 15 ppm, or about 0.5 ppm to about 10 ppm, or about 1 ppm to about 9 ppm, or about 1 ppm to about 7 ppm, or about 1 ppm to about 6 ppm, or about 1 ppm to about 5 ppm, or about 3 ppm to about 6 ppm, or about 2 ppm to about 8 ppm. A low nitrogen second medium, according to some embodiments, may comprise a nitrogen concentration of at most about 10 ppm (e.g., ±1 ppm). In some embodiments, a low nitrogen second medium may comprise a nitrogen concentration of at most about 5 ppm (e.g., ±0.5 ppm). A low nitrogen second medium comprises at least some quantity of nitrogen in contrast to, for example, a no nitrogen second medium having no detectable nitrogen (i.e., $N_2$). In some embodiments, a second medium may be a no nitrogen second medium.

According to some embodiments, a second medium may be configured to have a low calcium composition (e.g., a low calcium second medium). For example, a low calcium second medium may comprise a calcium concentration of ≤about 20 ppm, ≤about 18 ppm, ≤about 16 ppm, or ≤about 14 ppm, or ≤about 12 ppm, or ≤about 10 ppm, or ≤about 9 ppm, or ≤about 8 ppm, or ≤about 7 ppm, or ≤about 6 ppm, or ≤about 5 ppm, or ≤about 4 ppm, or ≤about 3 ppm, or ≤about 2 ppm, or ≤about 1 ppm, or ≤about 0.5 ppm, or about 0 ppm. In some embodiments, a low calcium second medium may comprise a calcium concentration of about 0 ppm to about 20 ppm, or about 0.5 ppm to about 20 ppm, or about 0.5 ppm to about 15 ppm, or about 0.5 ppm to about 10 ppm, or about 1 ppm to about 9 ppm, or about 1 ppm to about 7 ppm, or about 1 ppm to about 6 ppm, or about 1 ppm to about 5 ppm, or about 3 ppm to about 6 ppm, or about 2 ppm to about 8 ppm. A low calcium second medium, according to some embodiments, may comprise a calcium concentration of at most about 10 ppm (e.g., ±1 ppm). In some embodiments, a low calcium second medium may comprise a calcium concentration of at most about 5 ppm (e.g., ±0.5 ppm). In some embodiments, soaking a biomass in a low calcium second medium may effect the equilibrium between an oxalic acid concentration and an oxalate concentration (e.g., calcium oxalate).

In some embodiments, a second medium may be configured to have a high calcium composition (e.g., a high calcium second medium). For example, a high calcium second medium may comprise a calcium concentration of ≤about 800 ppm, or ≤about 750 ppm, or ≤about 700 ppm, or ≤about 650 ppm, or ≤about 600 ppm, or ≤about 550 ppm, or ≤about 500 ppm, or ≤about 450 ppm, or ≤about 400 ppm, or ≤about 350 ppm, or ≤about 300 ppm, or ≤about 250 ppm, or ≤about 200 ppm, or ≤about 150 ppm, or ≤about 100 ppm, or ≤about 50 ppm. In some embodiments, a high calcium second medium may comprise a calcium concentration of about 50 ppm to about 200 ppm, or about 50 ppm to about 400 ppm, or about 50 ppm to about 600 ppm, or about 100 ppm to about 800 ppm, or about 100 ppm to about 700 ppm, or about 100 ppm to about 600 ppm, or about 100 ppm to about 500 ppm, or about 300 ppm to about 600 ppm, or about 200 ppm to about 800 ppm. A high calcium second medium, according to some embodiments, may comprise a calcium concentration of at most about 800 ppm (e.g., ±50 ppm). In some embodiments, a high calcium second medium may comprise a calcium concentration of at most about 600 ppm (e.g., ±50 ppm). In some embodiments, soaking a biomass in a high calcium second medium may effect the equilibrium between an oxalic acid concentration and an oxalate concentration (e.g., calcium oxalate). For example, soaking a biomass in a high calcium second medium may convert oxalic acid into oxalate.

In some embodiments, a second medium may be configured to have a low calcium composition and a low nitrogen composition (e.g., a low nitrogen and calcium growth medium). For example, a low nitrogen and calcium growth medium may comprise a calcium concentration of ≤about 20 ppm, or ≤about 18 ppm, or ≤about 16 ppm, or ≤about 14 ppm, or ≤about 12 ppm, or ≤about 10 ppm, or ≤about 9 ppm, or ≤about 8 ppm, or ≤about 7 ppm, or ≤about 6 ppm, or ≤about 5 ppm, or ≤about 4 ppm, or ≤about 3 ppm, or ≤about 2 ppm, or ≤about 1 ppm, or ≤about 0.5 ppm, or about 0 ppm. A low nitrogen and calcium growth medium may comprise a nitrogen concentration of ≤about 20 ppm, or ≤about 18 ppm, or ≤about 16 ppm, or ≤about 14 ppm, or ≤about 12 ppm, or ≤about 10 ppm, or ≤about 9 ppm, or ≤about 8 ppm, or ≤about 7 ppm, or ≤about 6 ppm, or ≤about 5 ppm, or ≤about 4 ppm, or ≤about 3 ppm, or ≤about 2 ppm, or ≤about 1 ppm, or ≤about 0.5 ppm, or about 0 ppm. In some embodiments, a low nitrogen and calcium second medium may comprise a calcium concentration of about 0 ppm to about 20 ppm, or about 0.5 ppm to about 20 ppm, or 0.5 ppm to about 15 ppm, or 0.5 ppm to about 10 ppm, or about 1 ppm to about 9 ppm, or about 1 ppm to about 7 ppm, or about 1 ppm to about 6 ppm, or about 1 ppm to about 5 ppm, or about 3 ppm to about 6 ppm, or about 2 ppm to about 8 ppm. In some embodiments, a low nitrogen and calcium second medium may comprise a nitrogen concentration of about 0 ppm to about 20 ppm, or about 0.5 ppm to about 20 ppm, or 0.5 ppm to about 15 ppm, or 0.5 ppm to about 10 ppm, or about 1 ppm to about 9 ppm, or about 1 ppm to about 7 ppm, or about 1 ppm to about 6 ppm, or about 1 ppm to about 5 ppm, or about 3 ppm to about 6 ppm, or about 2 ppm to about 8 ppm. A low nitrogen and calcium second medium, according to some embodiments, may comprise a calcium concentration of at most about 10 ppm (e.g., ±1 ppm). In some embodiments, a low nitrogen and calcium second medium may comprise a calcium concentration of at most about 5 ppm (e.g., ±0.5 ppm). A low nitrogen and calcium second medium, according to some embodiments, may comprise a nitrogen concentration of at most about 10 ppm (e.g., ±1 ppm). In some embodiments, a low nitrogen and calcium second medium may comprise a nitrogen concentration of at most about 5 ppm (e.g., ±0.5 ppm). In some embodiments, soaking a biomass in a low nitrogen and low calcium second medium may effect the equilibrium between an oxalic acid concentration and an oxalate concentration (e.g., calcium oxalate).

Soaking a biomass may comprise submerging a biomass in a second medium to form a biomass slurry, according to some embodiments. In some embodiments, a biomass may be soaked for about 1 hour, or about 2 hours, or about 4 hours, or about 6 hours, or about 8 hours, or about 10 hours, or about 12 hours, or about 16 hours, or about 20 hours, or about 24 hours, or about 36 hours, or about 48 hours, or about 60 hours, or about 72 hours, or about 84 hours, or about 96 hours, or about 108 hours, or about 120 hours, or about 132 hours, or about 144 hours. Soaking a biomass may include agitation, flow, movement, spraying, or stirring of a second medium. According to some embodiments, a biomass slurry, including a soaked microcrop (e.g., *Lemna*) and a second medium (e.g., a low nitrogen second medium), may be conveyed to an inclined vibrating screen where a biomass (e.g., microcrop) may be separated from the second medium.

According to some embodiments a biomass may be buffered in a third medium, according to some embodiments. A third medium may comprise water (e.g., ground water, surface water, recycled water), distilled water, reverse osmosis water and/or nanofiltered water, according to some embodiments. In some embodiments, a third medium may comprise any desired portion of recycled fluid. For example, a third medium may comprise at least about 10% (v/v), at least about 20% (v/v), at least about 30% (v/v), at least about 40% (v/v), at least about 50% (v/v), at least about 60% (v/v), at least about 70% (v/v), at least about 80% (v/v), or at least about 90% (v/v) recycled fluid from another stage of the process.

Buffering a pH of a biomass may comprise submerging a biomass in a third medium to form a biomass slurry, according to some embodiments. In some embodiments, a biomass may be buffered for about 1 hour, or about 2 hours, or about 4 hours, or about 6 hours, or about 8 hours, or about 10 hours, or about 12 hours, or about 16 hours, or about 20 hours, or about 24 hours, or about 36 hours, or about 48 hours. According to some embodiments, a biomass slurry, including a buffered microcrop (e.g., *Lemna*) and a third medium (e.g., distilled water, ground water, surface water, rain water), may be conveyed to an inclined vibrating screen where a biomass (e.g., microcrop) may be separated from the third medium. In other embodiments, a biomass (e.g., microcrop) may be separated from the third medium by draining.

According to some embodiments, buffering a pH of a biomass may include changing (e.g., raise, lower) or maintaining a pH value of the biomass. In some embodiments, buffering a biomass may comprise changing (e.g., raising, lowering) or maintaining a pH value of a biomass to below about 8.0, or below about 7.5, or below about 7.0, or below about 6.5, or below about 6.0, or below about 5.5, or below about 5.0, or below about 4.5, or below about 4.0, or below about 3.5, or below about 3.0. According to some embodiments, buffering a biomass may comprise changing (e.g., raising, lowering) or maintaining a pH value of a biomass to a range of: from about 3.0 to about 7.5, or from about 3.5 to about 7.5, or from about 4.0 to about 7.5, or from about 4.5 to about 7.5, or from about 5.0 to about 7.5, or from about 5.5 to about 7.5, or from about 6.0 to about 7.5, or from about 6.5 to about 7.5. As would be appreciated by someone having ordinary skill in the art, buffering a biomass by adjusting a pH value of a biomass may promote protein stability which may, in some embodiments, promote greater protein yields in comparison to a non-buffered biomass.

One or more of a soaked biomass and a buffered biomass generated in one procedure may be stored in their respective container (e.g., soaking container, buffering container) before being fed to one or more downstream procedures or apparatuses. This may accommodate different operation schedules or modes including, for example, continuous mode, batch mode, or multiple feeding streams to one or more downstream procedure(s) and/or apparatus(es). For example, in some embodiments, a biomass may be harvested during daylight hours and processed (e.g., soaking and/or buffering), subsequently the processed biomass may be further processed (e.g., lysing, separating) in smaller batches (e.g., a first portion, a second portion) to accommodate the capacity limitations of the downstream processing machinery.

Washing a Biomass

In some embodiments, processing a microcrop or biomass (e.g., first portion, second portion) may include a wash procedure (e.g., FIG. 1B 106, FIG. 2B 206) to remove excess growth medium, a solvent solution, debris, contaminants, microorganisms, and/or toxins. Washing a biomass may increase a purity and/or yield of a protein product. A wash procedure may disinfect and/or disinfest a biomass, reducing or removing bacteria, fungi, viruses, insects, and any combination thereof which are on or around the surfaces of the biomass. In some embodiments a wash procedure may be performed by exposing (e.g., submerging, spraying) at least one surface of a biomass to a wash solution (e.g., water, growth medium, antimicrobial solution). A wash solution, in some embodiments, may be combined with a biomass (e.g., first portion, second portion) to form a slurry.

In some embodiments, a wash solution may comprise any desired portion of recycled fluid. For example, a wash solution may comprise at least about 10% (v/v), at least about 20% (v/v), at least about 30% (v/v), at least about 40% (v/v), at least about 50% (v/v), at least about 60% (v/v), at least about 70% (v/v), at least about 80% (v/v), or at least about 90% (v/v) recycled from another stage of the process (e.g., recycled wash solution FIG. 1D 108, filtered blanching solution FIG. 1B 130, FIG. 2B 230). In some embodiments a wash solution may be an aqueous solution or solvent. A wash solution may contain one or more antimicrobials, de-infestation compounds, fatty acids, alcohols, chlorine, oxidizing compounds, and any combination thereof (e.g., ozonated water).

According to some embodiments a wash solution may be applied at a high pressure. A wash solution may remain in contact with a biomass for at least about 1 second, or for at least about 5 seconds, or for at least about 10 seconds, or for at least about 20 seconds, or for at least about 30 seconds, or for at least about 1 minute, or for at least about 5 minutes. In some embodiments, a second wash solution (e.g., water, ozonated water, a recycled wash solution (FIG. 1B 108, FIG. 2B 208), a filtered blanching solution (FIG. 1B 130, FIG. 2B 230) may be applied to a biomass. A third wash solution (e.g., water, ozonated water, a recycled wash solution (FIG. 1B 108, FIG. 2B 208), a filtered blanching solution (FIG. 1B 130, FIG. 2B 230) may be applied to a biomass, in some embodiments. A composition of a first wash solution, a second wash solution, and a third wash solution may be the same or different from one another. In some embodiments a first wash solution may be or may comprise a filtered blanching solution (FIG. 1B 130, FIG. 2B 230), a second wash solution may be water, and a third wash solution may be ozonated water. Some or all of a wash solution (e.g., a first, second, and/or third wash solution), in some embodiments, may be separated from a biomass (e.g., using an inclined screen or vibratory screen).

In some embodiments, some or all of a wash solution, second wash solution, and/or third wash solution may be collected and reused/recycled (e.g., a recycled wash solution (FIG. 1B 108, FIG. 2B 208). At least about 40%, or at least about 50%, or at least about 60%, or at least about 70%, or at least about 80%, or at least about 90%, or at least about 95% of a wash solution, second wash solution, and/or third wash solution (e.g., water) separated from the biomass may be recycled for future use as a recycled wash solution and/or as growth medium in the bioreactor system (FIG. 1B 108, FIG. 2B 208), according to some embodiments.

A wash solution, second wash solution, and/or third wash solution, in some embodiments, may have or may be adjusted to have any desired pH. For example, the pH of a wash solution, second wash solution, and/or third wash solution may be neutral or basic (e.g., about 7.0, or about 7.5, or about 8.0, or about 8.5, or about 9.0, or about 9.5, or about 10.0). According to some embodiments, the pH of a wash solution, second wash solution, and/or third wash solution may be from about 7.0 to about 7.5, or from about 7.5 to about 8.0, or from about 8.0 to about 8.5, or from about 8.5 to about 9.0, or from about 9.0 to about 9.5, or from about 9.5 to about 10.0. The pH of a wash solution, second wash solution, and/or third wash solution may be from about 7.0 to about 10.0, or from about 7.0 to about 9.5, or from about 7.0 to about 9.0, or from about 7.0 to about 8.5, or from about 7.0 to about 8.0, or from about 7.0 to about 7.5, in some embodiments.

A wash solution (e.g., a first, second, and/or third wash solution) may have a temperature below room temperature (e.g., about 12° C.) at the time of use. Cooling a wash solution, and thereby the microcrop, may improve protein recovery efficiency and/or decrease proteolytic activity. In some embodiments, a wash solution (e.g., a first, second, and/or third wash solution) may have a temperature below about 30° C., or below about 20° C., or below about 15° C., or below about 10° C., or below about 5° C., or below about 2° C., or below about 1° C., or below about 0° C. at the time of use. A wash solution (e.g., a first, second, and/or third wash solution) may have a temperature between about 0° C. and about 10° C., or between about 5° C. and about 15° C., or between about 10° C. and about 20° C., or 15° C. and about 25° C., or between about 20° C. and about 30° C. at the time of use, in some embodiments.

Blanching a Biomass

In some embodiments, processing a microcrop or biomass (e.g., first portion, second portion) may include blanching a microcrop material (e.g., FIG. 1A 110, FIG. 2A 210) to form a wet protein concentrate (e.g., FIG. 1A 111, FIG. 2A 211). Blanching may be performed, for example, on a biomass: (1) after harvesting (e.g., FIG. 1A 104, FIG. 2A 204); or (2) after harvesting and washing (e.g., FIG. 1C 104/106, FIG. 2C 204/206), in some embodiments. According to some embodiments, a blanching procedure may be used either instead of or in addition to a wash procedure. Blanching, according to some embodiments, may decrease an ash content, an oxalic acid content, and/or a phenol (e.g., tannin) content of a high-concentration protein product (e.g., wet, flake/granule, flour, a dry milled protein concentrate).

According to some embodiments, blanching may include contacting (e.g., immersing, submerging) a biomass with a blanching solution. Contacting a biomass, in some embodiments, may include applying (e.g., showering) a blanching solution to at least one surface of the biomass, submerging the (e.g., completely, partially) biomass, subjecting at least one surface of the biomass to a wave of the blanching solution. Applying a biomass may include cascading, showering, spraying, misting, fogging, pouring, or dripping the blanching solution, or any combination thereof, in some embodiments. According to some embodiments, a wave of blanching solution may include any disturbance on a top surface of a volume of blanching solution, such as a wave action, a ridge, a swell, or a ripple that may be capable of depositing any quantity of blanching solution onto a top surface (i.e., a surface facing away from a bottom surface of a container holding the blanching solution) of a biomass. In some embodiments, a ratio of a blanching solution to a biomass (w/w) may be 10:1, or 9:1, or 8:1, or 7:1, or 6:1, or 5.5:1, or 5:1, or 4.5:1, or 4:1, or 3.5:1, or 3:1, or 2.5:1, or 2:1, or 1.5:1, or 1:1.

According to some embodiments, blanching a biomass 110 may be performed at a product flow rate ratio calculated by dividing a pump rate by a feed rate. For example, blanching a biomass may have a product flow rate ratio of 7:1 where a blanching solution is transported at a pump rate of 28 liters per min (L/min) and a biomass is transported at a feed rate of 4 kg per min (kg/min). According to some embodiments, a blanching a biomass may have a product flow rate ratio of about 10:1, or about 9:1, or about 8:1, or about 7.5:1, or about 7:1, or about 6.5:1, or about 6:1, or about 5.5:1, or about 5:1, or about 4.5:1, or about 4:1, or about 3.5:1, or about 3:1, or about 2.5:1, or about 2:1, or about 1.5:1, or about 1:1, according to some embodiments.

A blanching solution may comprise water, surface water, well water, distilled water, reverse osmosis water, and/or nanofiltered water, according to some embodiments. In some embodiments, a blanching solution may comprise any desired portion of recycled fluid. For example, a blanching solution may comprise at least about 10% (v/v), at least about 20% (v/v), at least about 30% (v/v), at least about 40% (v/v), at least about 50% (v/v), at least about 60% (v/v), at least about 70% (v/v), at least about 80% (v/v), or at least about 90% (v/v) recycled from another stage of the process (e.g., recycled blanching solution FIG. 1A 122, FIG. 2A 222). In some embodiments, a blanching solution may further comprise at least one calcium salt (e.g., calcium chloride, calcium acetate). Blanching a biomass with a blanching solution comprising at least one calcium salt (e.g., calcium chloride, calcium acetate) may remove at least some soluble oxalic acid from a biomass by conversion to insoluble calcium oxalate. In some embodiments, a calcium salt may be selected from calcium chloride, calcium acetate, calcium carbonate, calcium hydroxide, or a combination thereof.

A blanching solution, in some embodiments, may have a temperature at the time it contacts a biomass of more than about 60° C., or more than about 65° C., or more than about 70° C., or more than about 75° C., or more than about 80° C., or more than about 85° C., or more than about 90° C., or more than about 95° C., or more than about 100° C. According to some embodiments, a blanching solution may be in liquid form, gaseous form (e.g., steam) or combinations thereof.

A biomass may be blanched (e.g., contacted with, immersed in, or submerged in a blanching solution, steam exposure) for up to about 20 sec, or up to about 30 seconds (sec), or up to about 40 sec, or up to about 50 sec, or up to about 1 min, or up to about 1 min 15 sec, or up to about 1 min 30 sec, or up to about 1 min 45 sec, or up to about 2 min, or up to about 2 min 30 sec or up to about 3 min, or up to about 4 min, or up to about 5 min, or up to about 6 min, or up to about 7 min, or up to about 8 min, or up to about 9 min, or up to about 10 min, according to some embodiments. In some embodiments, a biomass may be blanched for about 20 sec to about 40 sec, or about 30 sec to about 45 sec, or about 30 sec to about 1 min, or about 30 sec to about 1 min 30 sec, or about 30 sec to about 2 min, or about 30 sec to about 5 min, or about 1 min to about 5 min, or about 1 min to about 5 min, or about 1 min to about 10 min, or about 30 sec to about 10 min, where "about" may represent plus or minus 10%. According to some embodiments, a biomass may be blanched at about 85° C. for about 45 sec.

A blanching solution, in some embodiments, may change temperature while contacting a biomass. For example, according to some embodiments, a biomass may be contacted by a blanching solution having an initial temperature of between about 92° C. and about 94° C. where the contact continues for a period of about 40 sec at which point the blanching solution may have a final contact temperature of between about 75° C. and about 77° C. In some embodiments, a blanching solution, in some embodiments, may have an initial temperature (e.g., a temperature at a time where the blanching solution first contacts a biomass) of more than about 60° C., or more than about 65° C., or more than about 70° C., or more than about 75° C., or more than about 80° C., or more than about 85° C., or more than about 90° C., or more than about 95° C., or more than about 100° C. A blanching solution, in some embodiments, may have a final contact temperature (e.g., a temperature at a time where the biomass exits the blanching tray) of less than about 60° C., or less than about 65° C., or less than about 70° C., or less than about 75° C., or less than about 80° C., or less than about 85° C., or less than about 90° C., or less than about 95° C., or less than about 100° C.

In some embodiments, some or all of a blanching solution may be separated from a wet protein concentrate (e.g., FIG. 1A 111). A blanching solution may be separated from a wet protein concentrate, in some embodiments, using gravity separation, draining, an inclined screen, a vibratory screen, filtration, a decanter centrifuge, a belt press, a fan press, a rotary press, a screw press, a filter press, a finisher press, or any combination thereof, according to some embodiments.

In some embodiment, a separated blanching solution may be collected and reused/recycled (e.g., recycled blanching solution FIG. 1A 122, FIG. 2A 222). According to some embodiments, recycling a separated solution may include monitoring a separated solution. According to some embodiments, monitoring a separated solution may include monitoring a composition (e.g., total dissolved solids) and/or temperature of a separated solution. Monitoring a composition of a separated solution may include monitoring one or more of the following: total dissolved solids, total solids, turbidity, electrical conductivity, nutrient (e.g., nitrogen) composition, salinity, pH, in some embodiments.

In some embodiments, recycling a separated solution may include maintaining or adjusting a composition (e.g., total solids, turbidity) of a separated solution. Maintaining or adjusting a composition of a separated solution, in some embodiments, may include maintaining or adjusting a total solids content of a volume of separated solution at/to a value of less than 0.5% w/w), or less than 1% (w/w) or less than 2% (w/w), or less than 4% (w/w), or less than 6% (w/w) or less than 8% (w/w), or less than 10% (w/w). According to some embodiments, maintaining or adjusting a composition of a separated solution may include maintaining or adjusting a turbidity value (e.g., relative to absorbance of a 500 nm light source where 1.0 is equivalent to 10% absorbance and 10.0 is equivalent to 100% absorbance) of a volume of separated solution at a value of less than about 0.5, or less than about 0.75, or less than about 1.0, or less than about 1.25, or less than about 1.5, where about may represent plus or minus 5%. In some embodiments, maintaining or adjusting a composition of a separated solution may include maintaining or adjusting an electrical conductivity value of the separated solution at/to a value of less than about 2000 µS/cm, or less than about 2500 µS/cm, or less than about 3000 µS/cm, or less than about 3500 µS/cm, or less than about 4000 µS/cm, or less than about 4500 µS/cm, or less than about 5000 µS/cm, or less than about 5500 µS/cm, or less than about 6000 µS/cm, where "about" may represent plus or minus 250 µS/cm.

In some embodiments, maintaining or adjusting a composition of a separated solution may include diluting a separated solution. Dilution of a separated solution may be desirable to adjust a composition of the separated solution (e.g., dissolved solids content, turbidity). A diluted separated solution may be recycled as a blanching solution, as a wash solution, as a settling solution, as a cooling solution, or any combination thereof, in some embodiments.

In some embodiments, diluting a separated solution may involve discarding a volume of discard solution and adding a volume (e.g., an equal volume) of a dilution solution. A discard solution may have a volume equal to a volume of dilution solution necessary to achieve a desired composition of dissolved solids (e.g., ash), according to some embodiments. In some embodiments, a discard solution may have a volume higher than a volume of dilution solution necessary to achieve a desired composition of dissolved solids (e.g., ash).

In some embodiments, a discard solution may be recycled as a growth medium in the cultivation of a microcrop. A dilution solution, according to some embodiments, may include water, ground water, well water, distilled water, deionized water, reverse osmosis water, nanofiltered water, ultra-filtered water, or any combination thereof.

According to some embodiments, a separated solution may be diluted to comprise a desired composition of dissolved solids (e.g., ash) and/or total solids. In some embodiments, a volume of separated solution may be diluted to have a total solids content at a value of less than 0.5% w/w), less than 1% (w/w) or less than 2% (w/w), or less than 4% (w/w), or less than 6% (w/w) or less than 8% (w/w), or less than 10% (w/w). According to some embodiments, a separated solution may be diluted to have a turbidity value (e.g., relative to absorbance of a 500 nm light source where 1.0 is equivalent to 10% absorbance and 10.0 is equivalent to 100% absorbance) of a volume of separated solution at a value of less than about 0.5, or less than about 0.75, or less than about 1.0, or less than about 1.25, or less than about 1.5, where about may represent plus or minus 5%. In some embodiments, a separated solution may be diluted to have an electrical conductivity value of less than about 2000 μS/cm, or less than about 2500 μS/cm, or less than about 3000 μS/cm, or less than about 3500 μS/cm, or less than about 4000 μS/cm, or less than about 4500 μS/cm, or less than about 5000 μS/cm, or less than about 5500 μS/cm, or less than about 6000 μS/cm, where "about" may represent plus or minus 250 μS/cm.

In some embodiments, a separated solution may be diluted relative to a biomass feed rate. According to some embodiments, a separated solution in collection tank may be diluted relative to a feed to dilution ratio of about 4:1, or about 3.5:1, or about 3:1, or about 2.5:1, or about 2:1, or about 1.5:1, or about 1:1.

Diluting a separated solution may include subjecting a donor stream and a recipient stream to a heat exchanger. According to some embodiments, a heat exchanger (e.g., thermal energy exchange mechanisms) may decrease an overall energy input required for production of high-concentration protein product (e.g., protein flake) from a microcrop (e.g., *Lemna*). According to some embodiments, a heat exchanger may include a flow system wherein a stream of discard solution (i.e., a donor stream) and a dilution solution stream (i.e., recipient stream) are adjacent such that thermal energy exchange may occur. In some embodiments, a dilution solution stream (i.e., a recipient stream) may have a cooler temperature and thereby a lower thermal energy than a donor stream (e.g., a discard solution stream which retains heat from a blanching solution). According to some embodiments, a heat exchanger may include a flow system (e.g., a series of pipes composed of conductive material) such that a dilution solution stream (i.e., a recipient stream) may absorb at least some thermal energy from a discard solution stream (i.e., a donor stream). In some embodiments, a heat exchanger may result in increasing a temperature of a dilution solution stream and/or a diluted separated solution.

According to some embodiments, a separated blanching solution may be filtered (e.g., FIG. 1A 128, FIG. 2A 228) to form a filtered blanching solution (e.g., FIG. 1A 130) and a blanching waste. Filtration may include, according to some embodiments, coarse filtration (e.g., gravity filtration, vibratory screen filtration), fine filtration (e.g., microfiltration, ultrafiltration, nanofiltration, reverse osmosis filtration), or any combination thereof. A filtered blanching solution may be recycled as a wash solution (e.g., FIG. 1C 130), as a growth medium in the cultivation of a microcrop (e.g., FIG. 1A 130), as a blanching solution, or any combination thereof. In some embodiments, a blanching waste (e.g., retentate from a filtration method) may be recycled as part of a growth medium (e.g., as a nutrient source) in a cultivation of a microcrop (e.g., FIG. 1A 126, FIG. 2A 226). At least about 40%, or at least about 50%, or at least about 60%, or at least about 70%, or at least about 80%, or at least about 90%, or at least about 95% of a blanching solution separated from the wet protein concentrate may be recycled for future use (e.g., recycled blanching solution used as a first, second, or third wash solution or further cycles of blanching), according to some embodiments.

Cooling a Wet Protein Concentrate

Figure 1B:
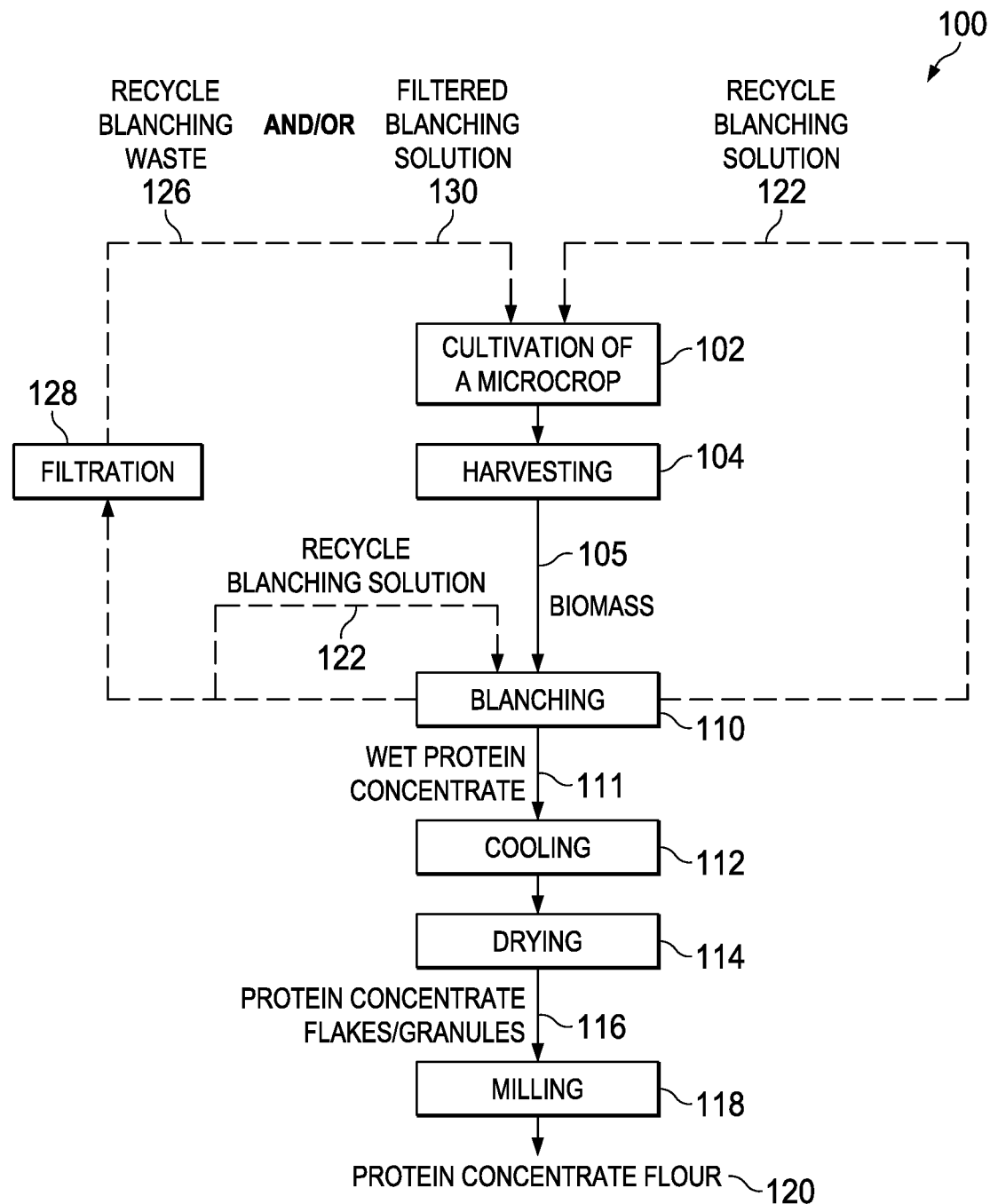
FIG. 1B is a flow diagram illustrating a process for cultivating, harvesting, and processing a microcrop for the production of high-concentration protein product according to a specific example embodiment of the disclosure.

According to some embodiments, a wet protein concentrate may be cooled (e.g., FIG. 1B 112). A cooling procedure may be performed by exposing (e.g., submerging, spraying) at least one surface of a wet protein concentrate to a cooling solution (e.g., water), or exposing at least one surface of a wet protein concentrate to decreased air temperatures or convective cooling conditions (e.g., wind, air movement), in some embodiments.

In some embodiments a cooling procedure may be performed by exposing (e.g., submerging, spraying) at least one surface of a wet protein concentrate to a cooling solution (e.g., water). A cooling solution, in some embodiments, may be combined with a wet protein concentrate (e.g., first portion, second portion) to form a slurry. According to some embodiments, a cooling solution may be combined with a wet protein concentrate after separation from a blanching solution. According to some embodiments, a blanching procedure may involve agitation or stirring of a blanching solution/biomass slurry. Agitation or stirring of a blanching solution/biomass slurry may be perpetual or intermittent, according to some embodiments. According to some embodiments, a dilution solution may be used to cool a wet protein concentrate, the dilution solution may then be collected and used to dilute a separated solution.

A cooling solution may remain in contact with a wet protein concentrate for at least about 30 seconds, or at least about 1 min, or at least about 5 min, or at least about 10 min, or at least about 15 min, or at least about 20 min, or at least about 25 min, or at least about 30 min. Some or all of a cooling solution, in some embodiments, may be separated from a wet protein concentrate (e.g., using an inclined screen or vibratory screen). A cooling solution may be separated from a wet protein concentrate, in some embodiments, using gravity separation, draining, an inclined screen, a vibratory screen, filtration, a decanter centrifuge, a belt press, a fan press, a rotary press, a screw press, a filter press, a finisher press, or any combination thereof, according to some embodiments.

In some embodiments, some or all of a cooling solution may be collected and reused/recycled. At least about 40%, or at least about 50%, or at least about 60%, or at least about 70%, or at least about 80%, or at least about 90%, or at least about 95% of a cooling solution (e.g., water) separated from the wet protein concentrate may be recycled for future use as a cooling solution, a wash solution, as a growth medium for cultivation of a microcrop, or any combination thereof, according to some embodiments.

A cooling solution may have a temperature below room temperature (e.g., about 12° C.) at the time of use. In some embodiments, a cooling solution may have a temperature below about 50° C., or below about 40° C., or below about 30° C., or below about 20° C., or below about 15° C., or below about 10° C., or below about 5° C., or below about 2° C., or below about 1° C., or below about 0° C. at the time of use. A cooling solution may have a temperature between about 0° C. and about 10° C., or between about 5° C. and about 15° C., or between about 10° C. and about 20° C., or 15° C. and about 25° C., or between about 20° C. and about 30° C., or between about 0° C. and about 50° C. at the time of use, in some embodiments.

According to some embodiments, a wet protein concentrate may be cooled by exposing at least one surface of a wet protein concentrate to decreased air temperatures, or convective cooling conditions (e.g., wind, air movement), or any combination thereof. In some embodiments, a wet protein concentrate may be separated from a blanching solution before exposure of the wet protein concentrate to decreased air temperatures, or convective cooling conditions (e.g., wind, air movement), or any combination thereof. A slurry of a wet protein concentrate and a blanching solution may be exposed to decreased air temperatures, or convective cooling conditions (e.g., wind, air movement), or any combination thereof, according to some embodiments.

A decreased air temperature, in some embodiments, may include a temperature of less than 30° C., or less than 25° C., or less than 20° C., or less than 15° C., or less than 10° C., or less than 5° C., or less than 2° C., or less than 1° C., or less than 0° C.

Reducing a Moisture Content of a Wet Protein Concentrate

In some embodiments a process may be used to reduce a moisture content of a wet protein concentrate. According to some embodiments, a moisture content of a wet protein concentrate may be reduced without cooling the wet protein concentrate (e.g., FIG. 1B 112). Reducing a moisture content of a wet protein concentrate may reduce capital and operational expenditures, for example, by reducing the energy needed to dry an end protein product (e.g., protein concentrate flake/granule).

In some embodiments an evaporation process may be used to reduce a moisture content of a wet protein product. Evaporation may be performed by, for example, a thermal (evaporative) means such as: a rising film evaporator, a falling film evaporator, a natural circulation evaporator (vertical or horizontal), an agitated-film evaporator, a multiple-effect evaporator, by vacuum evaporation, or any combination thereof. Heat may be supplied directly into the evaporator, or indirectly through a heat jacket. Heat may either come from a raw source (e.g., combustion of natural gas, steam from a boiler) or from a waste heat stream (e.g., dryer exhaust) or from heat transferred by cooling the input stream.

According to some embodiments, a moisture content of a wet protein concentrate may be reduced using gravity separation, draining, an inclined screen, a vibratory screen, filtration, a decanter centrifuge, a belt press, a fan press, a rotary press, a screw press, a filter press, a finisher press, or any combination thereof.

In some embodiments an antioxidant (e.g., rosemary extract, Duralox®, Phyt-O-Blend CA) may be mixed with a wet protein product prior to drying to improve shelf life of product (e.g., shelf life of a packaged product). According to some embodiments, lecithin may be mixed with a wet protein product prior to drying to improve a mouth-feel of a product.

Solvent Extraction of Wet Protein Concentrate

According to some embodiments, processing a microcrop, or a biomass (e.g., first portion, second portion), or a wet protein concentrate may include a solvent extraction procedure (e.g., FIG. 2A 232) to generate a solvent washed protein product.

A solvent washed protein product, in some embodiments, may have increased protein purity when compared to a protein product that was not subjected to a solvent extraction procedure. A solvent extraction procedure (e.g., FIG. 2A 232) may decolor a microcrop, or a biomass, or a wet protein concentrate, according to some embodiments, resulting in a solvent washed protein product having a reduced chlorophyll content (e.g., visually perceivable reduction in green coloration) compared to unwashed counterparts. In some embodiments, a solvent extraction procedure may reduce a fat content of a protein concentrate (e.g., wet, flake/granule, flour). The reduction of a fat content may increase the shelf-life, improve odor, and/or improve a taste of a high-concentration protein product.

Solvent extraction of a microcrop, or a biomass, or a wet protein concentrate, in some embodiments, may comprise exposing (e.g., submerging, spraying, dripping) at least one surface of the microcrop, or the biomass, or the wet protein concentrate to a solvent solution (e.g., ethanol, methanol, acetone). A solvent solution, in some embodiments, may be combined with a microcrop, or a biomass, or a wet protein concentrate (e.g., first portion, second portion) to form a slurry. According to some embodiments, a solvent extraction procedure may include exposing (e.g., submerging, spraying, dripping, slurry) at least one surface of a microcrop, or a biomass, or a wet protein concentrate to a solvent solution for at least about 5 sec., at least about 15 sec., at least about 30 sec., at least about 45 sec., at least about 1 min., at least about 2 min., at least about 3 min., at least about 5 min., at least about 10 min., at least about 20 min., at least about 30 min., at least about 40 min., at least about 50 min., at least about 1 hour, at least about 2 hours, at least about 3 hours, at least about 4 hours, at least about 5 hours, at least about 6 hours, at least about 12 hours, or at least about 24 hours. A solvent extraction procedure, in some embodiments, may include moving (e.g., agitating, stirring, propelling) at least a portion of a solvent solution at a specified time, intermittently, or continually.

In some embodiments a solvent solution may include one or more alcohols (e.g., ethanol, methanol, propanol, isopropanol, glycerol), acetone, dichloromethane, ethyl acetate, hexane, ketones, or combinations thereof. A solvent solution may comprise at least about 10% (v/v), at least about 20% (v/v), at least about 30% (v/v), at least about 40% (v/v), at least about 50% (v/v), at least about 60% (v/v), at least about 70% (v/v), at least about 80% (v/v), or at least about 90% (v/v) of one or more alcohols (e.g., ethanol, methanol, propanol, isopropanol, glycerol), acetone, dichloromethane, ethyl acetate, hexane, ketones, or combinations thereof.

Figure 2A:
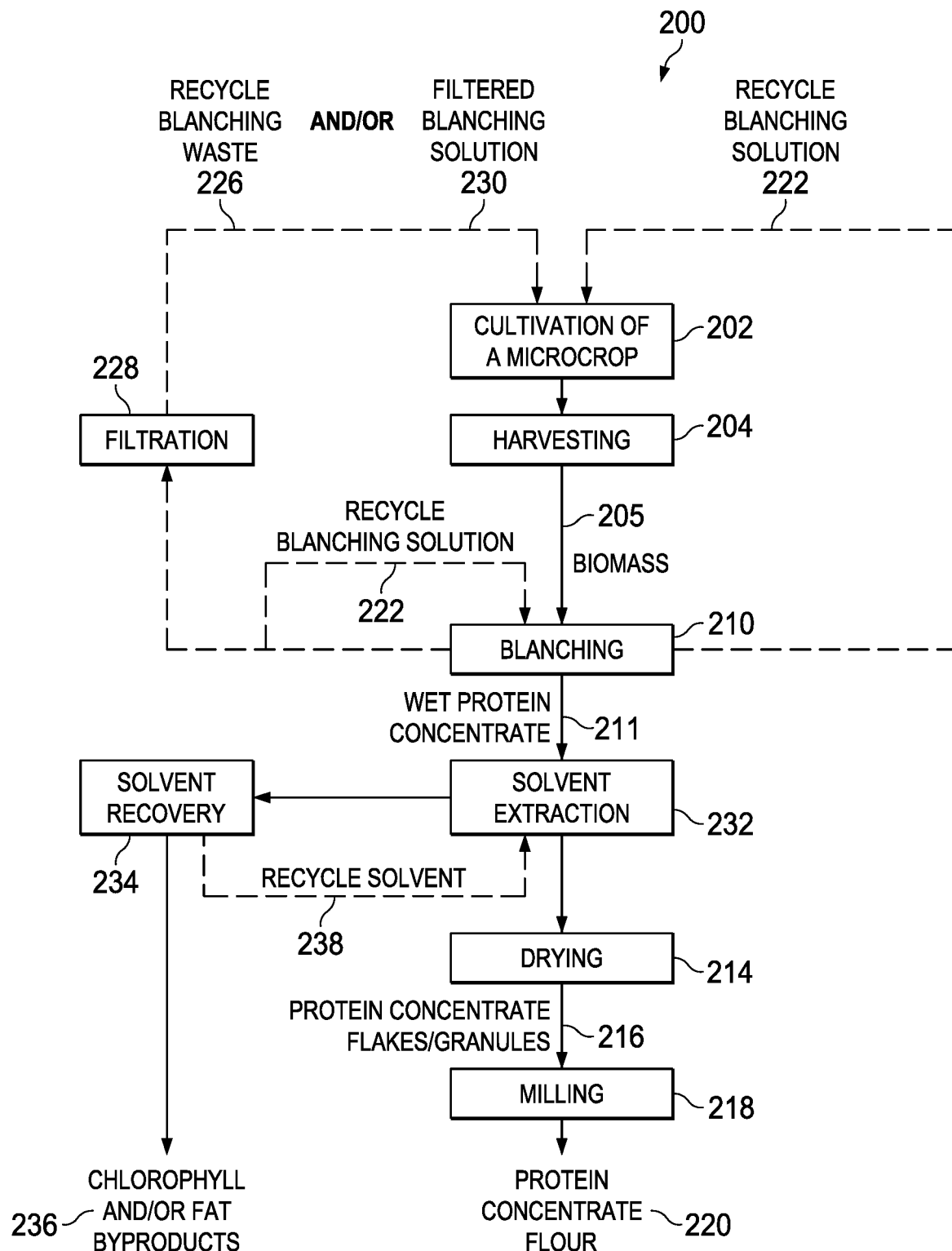
FIG. 2A is a flow diagram illustrating a system for cultivating, harvesting, and processing a microcrop for the production of high-concentration protein product according to a specific example embodiment of the disclosure.

In some embodiments, a solvent may be recovered (e.g., FIG. 2A 234) and recycled (e.g., FIG. 2A 238). Furthermore, according to some embodiments, a chlorophyll byproduct and/or a fat byproduct (e.g., FIG. 2A 236) extracted from a wet protein concentrate by solvent extraction (e.g., FIG. 2A 232) may be recovered from the solvent (e.g., FIG. 2A 234).

A solvent washed protein product, in some embodiments, may have a reduced fat content (e.g., about 2% of a protein concentrate flake/granule or less by weight) and/or a reduced chlorophyll content (e.g., visually perceivable reduction in green coloration) compared to unwashed counterparts. In some embodiments, a solvent washed protein product may appear colorless, white, substantially white, or have reduced green coloration. A solvent washed protein product, in some embodiments, may exhibit at least one of an improved odor, taste, color, shelf life (e.g., reduced oxidation of fats), protein density, malleability, or combinations thereof.

In some embodiments, a solvent washed protein product may have a fat content comprising (w/w) lower than about 20%, or lower than about 15%, or lower than about 10%, or lower than about 5%, or lower than about 4%, or lower than about 3%, or lower than about 2%, or lower than about 1%, or lower than 0.5%, or lower than 0.4%, or lower than 0.3%, or lower than 0.2%, or lower than 0.1% by weight of a dry protein concentrate (e.g., flake, granule, flour). According to some embodiments, a solvent washed protein product may have a fat content comprising from about 0.1% to about 10%, or from about 0.1% to about 5%, or from about 0.1% to about 2%, or from about 0.1% to about 1%, or from about 0.1% to about 0.5% by weight of the a dry protein concentrate (e.g., flake, granule, flour).

Drying a Protein Product

A wet protein concentrate or a solvent washed protein product may be dried to generate a protein concentrate flake or a protein concentrate granule (e.g., first portion, second portion), according to some embodiments. A drying procedure, in some embodiments, may reduce a moisture content of a wet protein concentrate or a solvent washed protein product to a desired level (e.g., lower moisture content, a desired moisture content). A moisture content of a protein concentrate flake/granule may be, for example, below about 90%, or below about 80%, or below about 70%, or below about 60%, or below about 50%, or below about 40%, or below about 30%, or below about 20%, or below about 10%, or below about 5%, or below about 1% by weight of the protein concentrate flake/granule, in some embodiments. A drying procedure may be performed using a mechanism including, for example, a spray dryer, a drum dryer, a double drum dryer, flash dryer, a fluid-bed dryer, a convection dryer, an evaporator, or any combination thereof.

In some embodiments, an inlet temperature of a dryer mechanism (the temperature at the entrance to a dryer) may be above 25° C., or above 50° C., or above 75° C., or above 100° C., or above 125° C., or above 150° C., or above 175° C., or above 200° C., or above 225° C., or above 250° C., or above 275° C., or above 300° C., or above 325° C., or above 350° C., or above 375° C., or above 400° C., or above 425° C., or above 450° C., or above 475° C., or above 500° C. An inlet temperature, in some embodiments, may be from about 25° C. to about 50° C., or from about 50° C. to about 75° C., or from about 75° C. to about 100° C., or from about 100° C. to about 125° C., or from about 125° C. to about 150° C., or from about 150° C. to about 175° C., or from about 175° C. to about 200° C., or from about 200° C. to about 225° C., or from about 225° C. to about 250° C., or from about 250° C. to about 275° C., or from about 275° C. to about 300° C., or from about 300° C. to about 325° C., or from about 325° C. to about 350° C., or from about 350° C. to about 375° C., or from about 375° C. to about 400° C., or from about 400° C. to about 425° C., or from about 425° C. to about 450° C., or from about 450° C. to about 475° C., or from about 475° C. to about 500° C., or above 500° C. An inlet temperature may be from about 50° C. to about 100° C., or from about 100° C. to about 150° C., or from about 150° C. to about 200° C., or from about 200° C. to about 250° C., or from about 250° C. to about 300° C., or from about 300° C. to about 350° C., or from about 350° C. to about 400° C., or from about 400° C. to about 450° C., or from about 450° C. to about 500° C., or above 500° C., in some embodiments. According to some embodiments, an inlet temperature of a dryer mechanism may be about 225° C.

According to some embodiments, an outlet temperature of a dryer mechanism (the temperature at the exit from a dryer) may be below about 300° C., or below about 275° C., or below about 250° C., or below about 225° C., or below about 200° C., or below about 175° C., or below about 150° C., or below about 125° C., or below about 100° C., or below about 75° C., or below about 50° C., or below about 25° C. An outlet temperature may be from about 300° C. to about 275° C., or from about 275° C. to about 250° C., or from about 250° C. to about 225° C., or from about 225° C. to about 200° C., or from about 200° C. to about 175° C., or from about 175° C. to about 150° C., or from about 150° C. to about 125° C., or from about 125° C. to about 100° C., or from about 100° C. to about 75° C., or from about 75° C. to about 50° C., or from about 50° C. to about 25° C., or below about 25° C., in some embodiments. An outlet temperature, in some embodiments, may be from about 300° C. to about 250° C., or from about 250° C. to about 200° C., or from about 200° C. to about 150° C., or from about 150° C. to about 100° C., from about 100° C. to about 50° C., or from about 50° C. to about 25° C., or below about 25° C. According to some embodiments, an outlet temperature of a dryer mechanism may be about 75° C.

In some embodiments, a volume of a wet protein concentrate or a volume of a solvent washed protein product may be mixed with a volume of a protein concentrate flake/granule prior to drying. This process, known as back-mixing, may be employed when, for example, the moisture content of a wet protein concentrate exceeds the level that a dryer mechanism is capable of accepting. By back-mixing a protein concentrate flake/granule with a wet protein concentrate or a solvent washed protein product, a total moisture content may be kept within the specifications of a dryer mechanism, thereby reducing operational costs (e.g., wear and tear on equipment).

Milling

According to some embodiments, a protein concentrate flake/granule may be milled (e.g., FIG. 1A 118, FIG. 2A 218) to form a protein concentrate flour 120. A milling procedure may involve a hammer mill, a pin mill, a vibrating mill, a fluid energy mill, a jet mill or any combination thereof.

An antioxidant (e.g., rosemary extract, Duralox®, Phyt-O-Blend CA) may be mixed with a protein concentrate flake/granule or a protein concentrate flour before packaging, according to some embodiments.

According to some embodiments, a wet protein concentrate or a partially dried (e.g., having a reduced moisture content) wet protein concentrate or a solvent washed protein concentrate may be frozen, flash-frozen, or freeze dried.

In some embodiments, a wet protein concentrate or a solvent washed protein concentrate may be milled prior to drying (e.g., a dry milled protein concentrate).

Protein Concentrate

Some embodiments relate to a process for production of a high-concentration protein product (e.g., a wet protein concentrate, a solvent washed protein concentrate, a protein concentrate flake/granule, a protein concentrate flour, a dry milled protein concentrate) from a biomass of a harvested microcrop (e.g., aquatic plant species, Lemna, algal species). A process may be configured or performed to achieve any desired protein yield (e.g., maximal yield, a selected yield). In some embodiments, a high-concentration protein product may have a protein concentration of at least about 35%, or at least about 40%, or at least about 45%, or at least about 50%, or at least about 60%, or at least about 65%, or at least about 70%, or at least about 75%, or at least about 80% by dry mass basis (DMB). A remainder of a high-concentration protein product may include carbohydrates, fiber, fats, minerals, or any combination thereof. A high-concentration protein product protein concentrate may be suitable for animal feed and/or human consumption. For example, a high-concentration protein product may serve as an effective replacement for protein concentrates (e.g., soy, pea) which are presently used in a large number of human food products either individually or as ingredients and additives. According to some embodiments, at least of portion of a protein composition of a high-concentration protein product may comprise denatured or partially-denatured protein.

Protein Digestibility Corrected Amino Acid Score (PDCAAS) and Digestibility

According to some embodiments, a high-concentration protein product may have a PDCAAS relative to a reference standard (e.g., casein) of at least 0.88, or at least 0.89, or at least 0.90, or at least 0.91, or at least 0.92, or at least 0.93, or at least 0.94, or at least 0.95. In some embodiments, a high-concentration protein product may have a PDCAAS of between 0.88 and 0.94, or between 0.90 and 0.94, or between 0.92 and 0.94. PDCAAS may be evaluated, for example, by an animal (e.g., rat) model or by an in vitro enzyme digestion model. Calculating a PDCAAS value may be dependent upon a limiting amino acid. According to some embodiments, a PDCAAS value of a high-concentration protein product may be limited by a histidine composition.

In some embodiments, a high-concentration protein product may have a digestibility of at least 88%, or at least 90%, or at least 92%, or at least 94%, or at least 95%, or at least 96%, or at least 97%, or at least 98% in each case. Digestibility may be determined, for example, using a rat model (casein digestibility) or an in vitro digestibility method (e.g., Animal-Safe Accurate Protein Quality Score (ASAP-Quality Score) method, TIM model, dynamic gastric model (DGM)).

Amino Acid Composition

In some embodiments, a high-concentration protein product may comprise one or more essential amino acids. For example, a high-concentration protein product may include one or more amino acids selected from leucine, isoleucine, lysine, methionine, phenylalanine, threonine, tryptophan, valine, histidine, arginine, aspartic acid, serine, glutamic acid, proline, glycine, alanine, tyrosine and cysteine. The concentration of an essential amino acid may be at least about 1 g/100 g of protein concentrate, or at least about 1.5 g/100 g of protein concentrate, or at least about 2 g/100 g of protein concentrate, or at least about 2.5 g/100 g of protein concentrate, or at least about 3 g/100 g of protein concentrate, or at least about 4 g/100 g of dry at least about 2.5 g/100 g of protein concentrate, or at least about 3 g/100 g of protein concentrate, or at least about 4 g/100 g of protein concentrate, or at least about 5 g/100 g of protein concentrate, or at least about 6 g/100 g of protein concentrate, or at least about 7 g/100 g of protein concentrate, or at least about 8 g/100 g of protein concentrate, or at least about 9 g/100 g of protein concentrate, or at least about 10 g/100 g of protein concentrate in some embodiments.

The concentration of an amino acid (e.g., an essential amino acid), in some embodiments, may be expressed as a weight fraction of the protein recovered from a high-concentration protein product, and is at least about 1 g/100 g of protein, or at least about 1.5 g/100 g of protein, or at least about 2 g/100 g of protein, or at least about 2.5 g/100 g of protein, or at least about 3 g/100 g of protein, or at least about 4 g/100 g of protein, or at least about 5 g/100 g of protein, or at least about 6 g/100 g of protein, or at least about 7 g/100 g of protein, or at least about 8 g/100 g of protein, or at least about 9 g/100 g of protein, or at least about 10 g/100 g of protein.

For example, a high-concentration protein product produced by the processes described herein may include the amino acid contents summarized in Table 2 below.

TABLE 2

Amino Acid Profiles of High Concentration Protein Products (g/100 g protein)

| Amino Acid | Product 1 | Product 2 |
|---|---|---|
| Tryptophan | 2.1 | 2.1 + 10% |
| Alanine | 4.8 | 4.8 + 10% |
| Arginine | 5.7 | 5.7 + 10% |
| Aspartic Acid | 7.8 | 7.8 + 10% |
| Glutamic Acid | 9.4 | 9.4 + 10% |
| Glycine | 4.1 | 4.1 + 10% |
| Histidine | 2.0 | 2.0 + 10% |
| Isoleucine | 4.4 | 4.4 + 10% |
| Leucine | 7.7 | 7.7 + 10% |
| Phenylalanine + Tyrosine | 8.8 | 8.8 + 10% |
| Proline | 3.9 | 3.9 + 10% |
| Serine | 3.4 | 3.4 + 10% |
| Threonine | 3.7 | 3.7 + 10% |
| Lysine | 6.0 | 6.0 + 10% |
| Valine | 5.3 | 5.3 + 10% |
| Cysteine + Methionine | 2.9 | 2.9 + 10% |

Fat Content

In some embodiments, a high-concentration protein product may have a fat content lower than about 20%, or lower than about 15%, or lower than about 10%, or lower than about 8%, or lower than about 5%, or lower than about 4%, or lower than about 3%, or lower than about 2%, or lower than about 1%, or lower than 0.5%, or lower than 0.4%, or lower than 0.3%, or lower than 0.2%, or lower than 0.1% by DMB of the protein product. A high-concentration protein product may have a fat content from about 1% to about 10%, or from about 10% to about 20%, or from about 0.1% to about 10%, or from about 0.1% to about 5%, or from about 0.1% to about 2%, or from about 0.1% to about 1%, or from about 0.1% to about 0.5% by DMB of the high-concentration protein product in some embodiments. A protein concentrate may be further processed to meet a desired fat content (e.g., higher or lower concentration, a desired fat composition).

Chlorophyll Content

According to some embodiments, a high-concentration protein product may have a reduced chlorophyll content. In some embodiments, a high-concentration protein product may appear colorless or have reduced green coloration. A high-concentration protein product may have a chlorophyll content of less than 6,000 mg/100 g, or less than 5,500 mg/100 g, or less than 5,000 mg/100 g, or less than 4,500 mg/100 g, or less than 4,000 mg/100 g, or less than 3,500 mg/100 g, or less than 3,000 mg/100 g.

Apiogalacturonan and/or Oligogalacturan Content

In some embodiments, a high-concentration protein product may include at least one apiogalacturonan and/or oligogalacturonide. According to some embodiments, a high-concentration protein product polysaccharide product may have a concentration of at least one apiogalacturonan of at least 1% DMB, or at least 3% DMB, or at least 5% DMB, or at least 7% DMB, or at least 10% DMB, or at least 12% DMB, or at least 15% DMB, or at least 20% DMB, or at least 25% DMB, or at least 30% DMB. A high-concentration protein product, in some embodiments, may have a concentration of at least one apiogalacturonan of at least 10% DMB. In some embodiments, a polysaccharide product may have a concentration of at least one apiogalacturonan of at least 15% DMB. Concentrations recited in this paragraph may refer to a single apiogalacturonan or to the combined (total) concentration of two or more (up to all) apiogalacturonans present, according to some embodiments.

According to some embodiments, a concentration of at least one apiogalacturonan and/or oligogalacturonide in a high-concentration protein product may be determined by a phenol-sulfuric acid method, such as that described in Dubois, M., Gilles, K. A., Hamilton, J. K., et al., *Anal. Chem.*, 1956, vol. 28, no. 2, 350-356. A concentration of at least one apiogalacturonan and/or oligogalacturonide in a high-concentration protein product may be determined using UV spectrophotometry, such as that described in Albalasmeh, A., Berhe, A., and Ghezzeher, T., *Carbohydrate Polymers*, 2013, vol. 97, no. 2, 253-261, in some embodiments. Any desired method may be used to determine a concentration of at least one apiogalacturonan and/or oligogalacturonide in a high-concentration protein product.

A monosaccharide composition of a concentration of a high-concentration protein product may be determined by high pressure anion exchange chromatography (HPAEC), according to some embodiments. For example, HPAEC may be performed using a Dionex CarboPac PA1 column with amperometric detection of polysaccharide hydrolysis where hydrolysis was performed under the following conditions: (1) hydrolysis with 2N Trifluoracetic acid (TFA) at 100° C. for 0.5 hours; (2) hydrolysis with 2N TFA at 100° C. for 4 hours; (3) hydrolysis with 2N $H_2SO_4$ at 100° C. for 6 hours; (4) hydrolysis with 2N $H_2SO_4$ at 100° C. for 6 hours after overnight exposure to 26N $H_2SO_4$ at room temperature.

In some embodiments, a monosaccharide composition of a high-concentration protein product may be determined by gas phase chromatography. For example, the relative composition of a monosaccharide of a high-concentration protein product may be identified and quantified by (1) hydrolyzing the product to form monosaccharides by methaolysis; (2) trimethylsilying the monosaccharides to form volatilized monosaccharides; and (3) quantifying and identifying the volatilized monosaccharides as O-methylglycosides by gas phase chromatography.

Oxalic Acid Content

According to some embodiments, a high-concentration protein product may have a reduced oxalic acid ($H_2C_2O_4$ or HOOCCOOH) content. In some embodiments, a high-concentration protein product may have an oxalic acid content of lower than about 1.5%, or lower than about 1.4%, or lower than about 1.3%, or lower than about 1.2%, or lower than about 1.1%, or lower than about 1.0%, or lower than about 0.9%, or lower than about 0.8%, or lower than about 0.75%, or lower than about 0.7%, or lower than about 0.65%, or lower than about 0.6%, lower than about 0.55%, lower than about 0.5%, or lower than about 0.45%, or lower than about 0.4%, or lower than about 0.35%, or lower than about 0.3%, or lower than about 0.25%, or lower than about 0.2%, or lower than about 0.15%, or lower than about 0.1%, or lower than about 0.05%, or lower than about 0.04%, or lower than about 0.03%, or lower 0.02% by DMB. A high-concentration protein product, in some embodiments may have an oxalic acid content of from about 0.02% to about 0.6%, from about 0.02% to about 0.5%, or from about 0.02% to about 0.4%, or from about 0.02% to about 0.3%, or from about 0.02% to about 0.2%, or from about 0.02% to about 0.15%, or from about 0.02% to about 0.1% by DMB. In some embodiments, a high-concentration protein product may have an oxalic acid content of no more than 0.1%. According to some embodiments, a high-concentration protein product may have an oxalic acid content of no more than 0.05% DMB.

Polyphenol Content

In some embodiments, a high-concentration protein product may be reduced in at least one polyphenol (e.g., tannin). In some embodiments, a high-concentration protein product (e.g., a wet protein concentrate, a solvent washed protein concentrate, a protein concentrate flake/granule, a protein concentrate flour), may comprise polyphenol (e.g., total soluble polyphenol) at a concentration (mg/100 g of high-concentration protein product) of less than about 1.5 mg/100 g, or less than about 1.55 mg/100 g, or less than about 1.6 mg/100 g, or less than about 1.65 mg/100 g, or less than about 1.7 mg/100 g, or less than about 1.75 mg/100 g, or less than about 1.8 mg/100 g, or less than about 1.85 mg/100 g, or less than about 1.9 mg/100 g, or less than about 2.0 mg/100 g, or less than about 2.2 mg/100 g, or less than about 2.4 mg/100 g, or less than about 2.6 mg/100 g, or less than about 2.8 mg/100 g, or less than about 3.0 mg/100 g, or less than about 3.2 mg/100 g.

Ash Content

According to some embodiments, a high-concentration protein product may include an ash content consisting of a residue containing inorganic mineral elements. An ash content in some embodiments may be determined by combusting a protein product at a high temperature (e.g., ≥500° C.) to remove organic matter. A high-concentration protein product may have an ash content lower than about 50%, or lower than about 40%, or lower than about 30%, or lower than about 25%, or lower than about 20%, or lower than about 15%, or lower than about 10%, or lower than about 5%, or lower than about 4%, or lower than about 3%, or lower than about 2%, or lower than about 1% by DMB of the protein product, in some embodiments. A high-concentration protein concentrate may be further processed to meet a desired ash content (e.g., higher or lower concentration, a desired ash composition), according to some embodiments.

Carbohydrate Content

According to some embodiments, a high-concentration protein product may have a carbohydrate content (e.g., pectin) lower than about 50%, or lower than about 40%, or lower than about 30%, or lower than about 25%, or lower than about 20%, or lower than about 15%, or lower than about 10%, or lower than about 5%, or lower than about 4%, or lower than about 3%, or lower than about 2%, or lower than about 1% by DMB of the protein product. A high-concentration protein product, in some embodiments, may have a carbohydrate content from about 1% to about 10%, or from about 10% to about 20%, or from about 20% to about 30%, or from about 30% to about 40%, or from about 40% to about 50% by DMB of the protein product. In some embodiments, a high-concentration protein product may have a carbohydrate content from about 1% to about 50%, or from about 2% to about 40%, or from about 5% to about 30%, or from about 8% to about 20%, or from about 10% to about 15% by DMB of the protein product. A high-concentration protein product may be further processed to meet a desired carbohydrate content (e.g., higher or lower concentration, a desired carbohydrate composition).

Dietary Fiber Content

In some embodiments, a high-concentration protein product may have a dietary fiber content of at least about 20% DMB, or at least about 25%, or at least about 30%, or at least about 35%, or at least about 40%, or at least about 45%, or at least about 50%, where "about" may represent plus or minus 3%. According to some embodiments, a high-concentration protein product may have a dietary fiber content between about 20% and about 45%, or between about 30% and about 45%, or between about 35% and about 45%, where "about" may represent plus or minus 3%. A high-concentration protein product may be further processed to meet a desired dietary fiber content (e.g., higher or lower concentration, a desired dietary fiber composition).

Water-Binding Capacity

In some embodiments, a high-concentration protein product may have a water-binding capacity of about 4 milliliters of water per gram of high-concentration protein product (mug), or about 4.5 ml/g, or about 5.0 ml/g, or about 6.0 ml/g, or about 7.0 ml/g, or about 7.5 ml/g, or about 8.0 ml/g, or about 8.5 ml/g, or about 9.0 ml/g, or about 9.5 ml/g, or about 10.0 ml/g. According to some embodiments, a high-concentration protein product may have a water binding capacity of at least 4 ml/g, or at least 5 ml/g, or at least 6 ml/g, or at least 7 ml/g, or at least 7.5 ml/g, or at least 8 ml/g, or at least 8.5 ml/g, or at least 9 ml/g, or at least 9.5 ml/g.

Oil-Binding Capacity

In some embodiments, a high-concentration protein product may have an oil-binding capacity (e.g., corn oil) of about 2 milliliters of oil (e.g., corn oil) per gram of high-concentration protein product (ml/g), or about 2.5 ml/g, or about 3.0 ml/g, or about 3.5 ml/g, or about 4.0 ml/g, or about 4.5 ml/g, or about 5.0 ml/g, or about 5.5 ml/g. According to some embodiments, a high-concentration protein product may have a water binding capacity of at least 2 ml/g, or at least 2.5 ml/g, or at least 3.0 ml/g, or at least 3.5 ml/g, or at least 4.0 ml/g, or at least 4.5 ml/g, or at least 5.0 ml/g, or at least 5.5 ml/g. For example, a high-concentration protein product produced by the processes described herein may include the contents summarized in Table 3 below.

TABLE 3

Example Compositions of High-Concentration Protein Products

| Characteristic | Product 1 | Product 2 | Product 3 | Product 4 |
|---|---|---|---|---|
| Solids (DMB) | ≥90 | 88-95 | ≥90 | 88-95 |
| Moisture (DMB) | ≤10 | 5-12 | ≤10 | 5-12 |
| Protein (DMB) | ≥50 | 50-65 | ≥45 | 35-45 |
| PDCASS | ≥0.90 | 0.88-0.94 | ≥0.90 | 0.88-0.94 |
| PDCASS Limiting Amino Acid | Histidine | Histidine | Histidine | Histidine |
| Digestibility | ≥0.90 | 0.85-0.96 | ≥0.90 | 0.85-0.96 |
| Fat (DMB) | ≤1 | 0.05-1.5 | ≤10 | 5-10 |
| Ash (DMB) | ≤10 | 5-15 | ≤10 | 5-15 |
| Dietary Fiber (DMB) | ≥40 | 35-45 | ≥40 | 35-45 |
| Other carbohydrates (DMB) | ≤5 | 1-10 | ≤5 | 5-10 |
| Oxalic acid | ≤1.5 | 0.2-2.5 | ≤1 | 0.2-2.0 |

Any desired method may be used to determine a composition of a high-concentration protein product.

A product and/or process, in some embodiments, may be configured or performed so other characteristics of a high-concentration protein product (e.g., particle size, bacterial specification) meet desired criteria and/or may be suitable for an intended purpose.

In some embodiments, a high-concentration protein product may be packed and/or sealed in either an industry standard bag or drum of varying sizes. A sealing method of industry-standard grade may be used to ensure proper shelf-life and shipping conditions. A bag or drum may include printed instructions or specifications regarding, for example, its intended use, shelf-life, suggested storage conditions, shipping conditions, compositions, or the like, or a combination thereof. An antioxidant (e.g., rosemary extract, Duralox®, Phyt-O-Blend CA) may be mixed with a protein product before drying or packaging, according to some embodiments. According to some embodiments, lecithin may be mixed with a wet protein product prior to drying to improve a mouth-feel of a product.

FIGS. 1A, 1B, 1C, and 1D

FIGS. 1A, 1B, 1C, and 1D are schematic diagrams illustrating a method 100 for growing, harvesting, and processing a microcrop (e.g., aquatic plant species, *Lemna*, algal species) for the production of a high-concentration protein product according to a specific example embodiment of the disclosure. A microcrop (e.g., *Lemna*) may be cultivated in a bioreactor system 102 and harvested 104 to form a biomass. As shown in FIGS. 1A through 1D, in some embodiments a biomass may be processed to form a high-concentration protein product including a wet protein concentrate 111, a protein concentrate flake/granule 118, protein concentrate flour 122, or any combination thereof. High-concentration protein products may include products suitable for animal feed and/or human consumption. A process 100 may be performed indoors, outdoors, and any combination thereof based, for example, on the specific environmental characteristics of the location(s).

As shown in FIGS. 1A through 1D, a microcrop may be cultivated in a bioreactor system 102 (e.g., open bioreactor, closed bioreactor). A bioreactor system may contain a growth medium (e.g., water, a nutrient composition). In some embodiments, a bioreactor system, in some embodiments, may be configured to collect rainfall and/or to intake water from a source of recycled or ground water (e.g., storm water, recycled water) or any other suitable source. A bioreactor system may be configured, in some embodiments, to insert additional nutrients (e.g., nitrogen, phosphorus, potassium) or gases (e.g., oxygen; carbon dioxide) at desired time indicators or in response to sensor readings. In some embodiments, a bioreactor system may comprise a monitoring system. A bioreactor system, in some embodiments, may monitor and adjust a thickness and distribution of a microcrop mat. For example, when a microcrop reaches a desired thickness or distribution a bioreactor system may initiate harvest procedures.

At specified times (e.g., based on environmental conditions) or after a microcrop develops desired characteristics (e.g., mat thickness; mat distribution; maturation), a microcrop may be harvested 104 (e.g., manual, automated) from a bioreactor system, forming a biomass 105. An automated skimmer system, in some embodiments, may collect a microcrop from a bioreactor system and transfer a harvested microcrop (e.g., via a pumping system) onto an inclined vibrating screen to separate a biomass from growth medium and debris. In some embodiments a microcrop may be harvested by vacuum skimming the microcrop from a bioreactor system through a stationary screen filter. A microcrop may be harvested manually, according to some embodiments. A biomass slurry, including a harvested microcrop (e.g., *Lemna*) and a growth medium (e.g., water), may be conveyed to an inclined screen, which may optionally vibrate, where a biomass (e.g., microcrop) may be separated from the growth medium.

During harvesting 104, a separated growth medium may be recycled back into the bioreactor system or to an additional storage container (e.g., container or pond), according to some embodiments. In some embodiments, at least about 40% (v/v), or at least about 50% (v/v), or at least about 60% (v/v), or at least about 70% (v/v), or at least about 80% (v/v), or at least about 90% (v/v), or at least about 95% (v/v) of a growth medium (e.g., water) separated from a biomass may be recycled for future use.

Figure 1C:
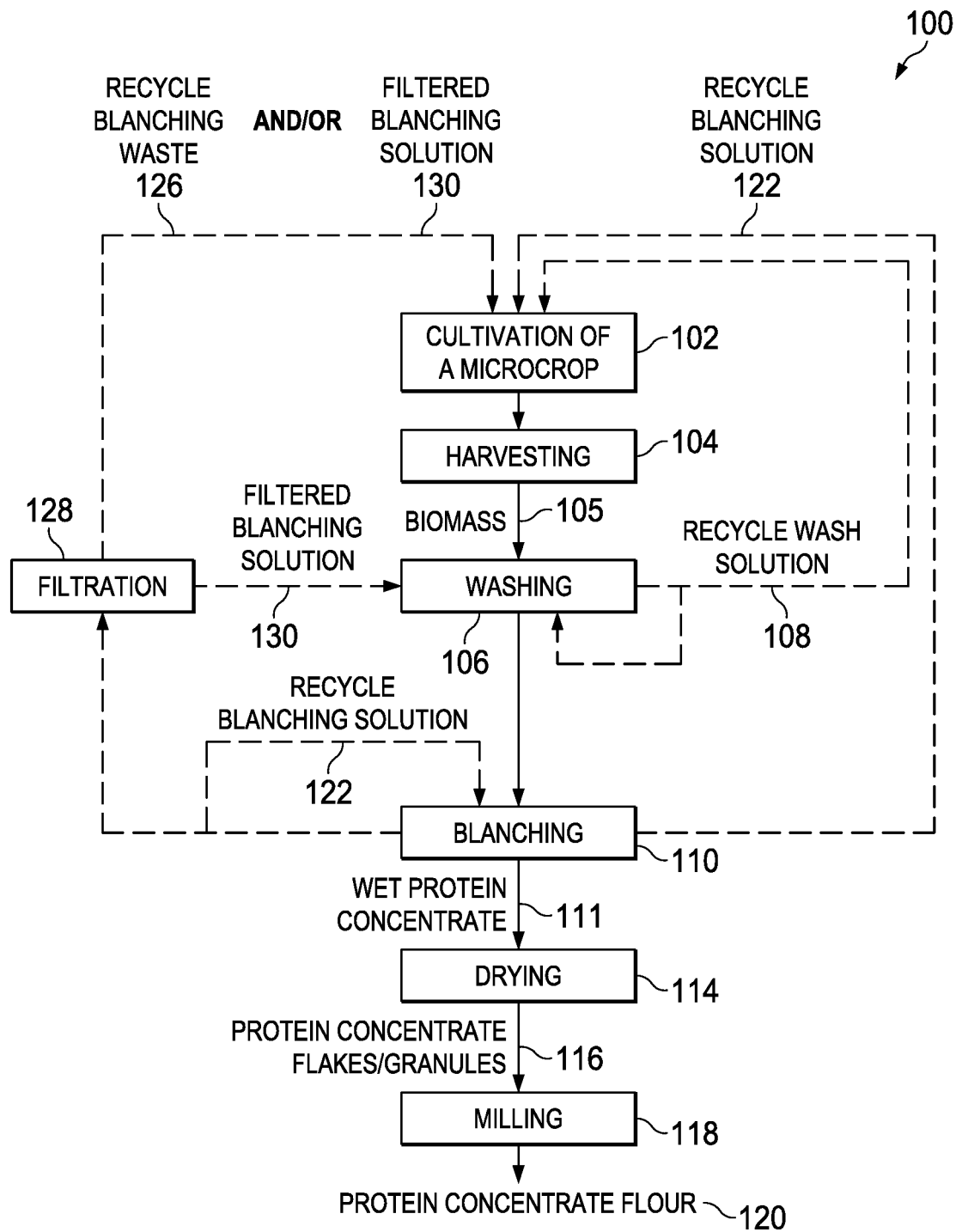
FIG. 1C is a flow diagram illustrating a process for cultivating, harvesting, and processing a microcrop for the production of high-concentration protein product according to a specific example embodiment of the disclosure.
Figure 1D:
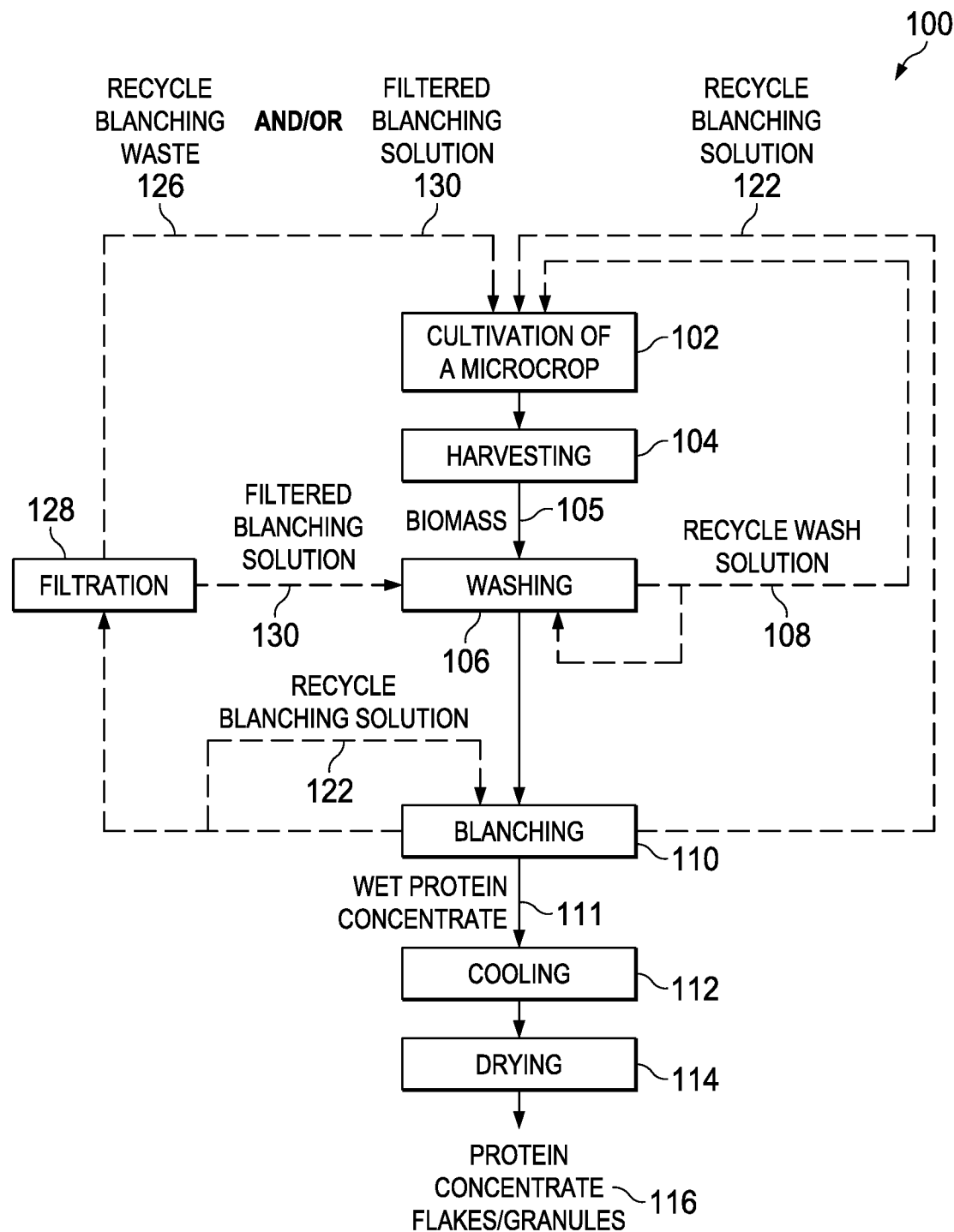
FIG. 1D is a flow diagram illustrating a process for cultivating, harvesting, and processing a microcrop for the production of high-concentration protein product according to a specific example embodiment of the disclosure.

As shown in FIGS. 1C and 1D, a biomass 105 may go through a wash procedure 106 (e.g., submerging, spraying, slurry) to remove debris, contaminants, microorganisms, and/or toxins. In some embodiments a wash procedure may be performed by exposing (e.g., submerging, spraying) at least about one surface of a biomass to a wash solution (e.g., water, growth medium, antimicrobial solution). A wash solution (e.g., water, ozonated water), in some embodiments, may be combined with a biomass to form a slurry. According to some embodiments, multiple washes (e.g., a first wash solution, a second wash solution, a third wash solution) may be applied to a biomass. Some or all of a wash solution (e.g., a first, second, and/or third wash solution), in some embodiments, may be separated from a biomass (e.g., using an inclined screen or vibratory screen).

In some embodiments, some or all of a wash solution, second wash solution, and/or third wash solution may be collected and reused/recycled 108. By volume, at least about 40%, or at least about 50%, or at least about 60%, or at least about 70%, or at least about 80%, or at least about 90%, or at least about 95% of a wash solution, second wash solution, and/or third wash solution (e.g., water) separated from the biomass may be recycled for future use (e.g., recycled wash solution or used as growth medium in the bioreactor system 108), according to some embodiments.

As shown in FIGS. 1A through 1D, a biomass, either washed or unwashed, may be blanched 110 to form a wet protein concentrate 111. According to some embodiments, a blanching procedure may include immersing or submerging a biomass in a blanching solution at a ratio of a blanching solution to a biomass (w/w) of 10:1, or 9:1, or 8:1, or 7:1, or 6:1, or 5.5:1, or 5:1, or 4.5:1, or 4:1, or 3.5:1, or 3:1, or 2.5:1, or 2:1, or 1.5:1, or 1:1. A blanching solution may comprise water, surface water, well water, distilled water, reverse osmosis, nanofiltered water, and/or recycled fluid, according to some embodiments. In some embodiments, a blanching solution may further comprise at least one calcium salt (e.g., calcium chloride, calcium acetate). A biomass may be blanched (e.g., immersed/submerged in a blanching solution) having a temperature above about 70° C., or above about 75° C., or above about 80° C., or above about 85° C., or above about 90° C., or above about 95° C., or above about 100° C. at the time of use for about 20 sec to about 40 sec, or about 30 sec to about 45 sec, or about 30 sec to about 1 min, or about 30 sec to about 1 min 30 sec, or about 30 sec to about 2 min, or about 30 sec to about 5 min, or about 1 min to about 5 min, or about 1 min to about 5 min, or about 1 min to about 10 min, or about 30 sec to about 10 min, where "about" may represent plus or minus 10%, according to some embodiments. According to some embodiments, a biomass may be blanched at about 85° C. for about 45 sec.

Some or all of a blanching solution may be separated from a wet protein concentrate 111 for example using gravity separation, draining, an inclined screen, a vibratory screen, filtration, a decanter centrifuge, a belt press, a fan press, a rotary press, a screw press, a filter press, a finisher press, or any combination thereof. As shown in FIGS. 1A through 1D, a separated blanching solution may be collected and reused/recycled 122. Further, according to some embodiments, a separated blanching solution may be filtered 128 to form a filtered blanching solution 130 and a blanching waste. Filtration may include, according to some embodiments, coarse filtration (e.g., gravity filtration, vibratory screen filtration), fine filtration (e.g., microfiltration, ultrafiltration, nanofiltration, reverse osmosis filtration), or any combination thereof. As shown in FIGS. 1A through 1D, a filtered blanching solution may be recycled as a wash solution 130, as a growth medium in the cultivation of a microcrop 130, as a blanching solution (not shown), or any combination thereof. In some embodiments, a blanching waste (e.g., retentate from a filtration method) may be recycled as part of a growth medium (e.g., as a nutrient source) in a cultivation of a microcrop 126.

As shown in FIGS. 1B and 1D, a wet protein concentrate may be cooled 112, for example by exposing (e.g., submerging, spraying) at least one surface of a wet protein concentrate to a cooling solution (e.g., water) or exposing at least one surface of a wet protein concentrate to decreased air temperatures or convective cooling conditions (e.g., wind, air movement), in some embodiments. A cooling solution may have a temperature below room temperature (e.g., about 12° C.) at the time of use. A cooling solution, in some embodiments, may be combined with a wet protein concentrate (e.g., first portion, second portion) to form a slurry. A cooling solution may remain in contact with a wet protein concentrate for at least about 30 seconds, or at least about 1 min, or at least about 5 min, or at least about 10 min, or at least about 15 min, or at least about 20 min, or at least about 25 min, or at least about 30 min. Some or all of a cooling solution, in some embodiments, may be separated from a wet protein concentrate (e.g., using an inclined screen or vibratory screen).

As shown in FIGS. 1A through 1D, a wet protein concentrate may be dried 114 to generate a protein concentrate flake or a protein concentrate granule 116 (e.g., first portion, second portion), according to some embodiments. A drying procedure may be performed using a mechanism including, for example, a spray dryer, a drum dryer, a double drum dryer, flash dryer, a fluid-bed dryer, a convection dryer, an evaporator, or any combination thereof.

According to some embodiments, a protein concentrate flake/granule may be milled 118, as shown in FIGS. 1B and 1C, to form a protein concentrate flour. A milling procedure may involve a knife mill, a hammer mill, a pin mill, a vibrating mill, a jet mill, a fluid energy mill, or any combination thereof.

FIGS. 2A, 2B, 2C, and 2D

FIGS. 2A, 2B, 2C, and 2D are schematic diagrams illustrating methods 200 for growing, harvesting, and processing a microcrop (e.g., aquatic plant species, *Lemna*, algal species) for the production of a high-concentration protein product according to a specific example embodiment of the disclosure. A microcrop (e.g., *Lemna*) may be cultivated in a bioreactor system 202 and harvested 204 to form a biomass 205. As shown in FIGS. 2A through 2D, in some embodiments a biomass may be processed to form a high-concentration protein product including a wet protein concentrate 211, a protein concentrate flake/granule 216, protein concentrate flour 220, or any combination thereof and a chlorophyll and/or fat byproduct 228. High-concentration protein products may include products suitable for animal feed and/or human consumption. A process 200 may be performed indoors, outdoors, and any combination thereof based, for example, on the specific environmental characteristics of the location(s).

As shown in FIGS. 2A through 2D, a microcrop may be cultivated 202 in a bioreactor system (e.g., open bioreactor, closed bioreactor) containing a growth medium (e.g., water, a nutrient composition). In some embodiments, a bioreactor system, may be configured to collect rainfall and/or to intake water from a source of recycled or ground water (e.g., storm water, recycled water) or any other suitable source. A bioreactor system may be configured, in some embodiments, to insert additional nutrients (e.g., nitrogen, phosphorus, potassium) or gases (e.g., oxygen; carbon dioxide) at desired time indicators or in response to sensor readings. In some embodiments, a bioreactor system may comprise a monitoring system. A bioreactor system, in some embodiments, may monitor and adjust a thickness and distribution of a microcrop mat. For example, when a microcrop reaches a desired thickness or distribution a bioreactor system may initiate harvest procedures.

At specified times (e.g., based on environmental conditions) or after a microcrop develops desired characteristics (e.g., mat thickness; mat distribution; maturation), a microcrop may be harvested 204 (e.g., manual, automated) from a bioreactor system, forming a biomass 205. A biomass slurry, including a harvested microcrop (e.g., *Lemna*) and a growth medium (e.g., water), may be conveyed to an inclined screen, which may optionally vibrate, where a biomass (e.g., microcrop) may be separated from the growth medium.

Figure 2B:
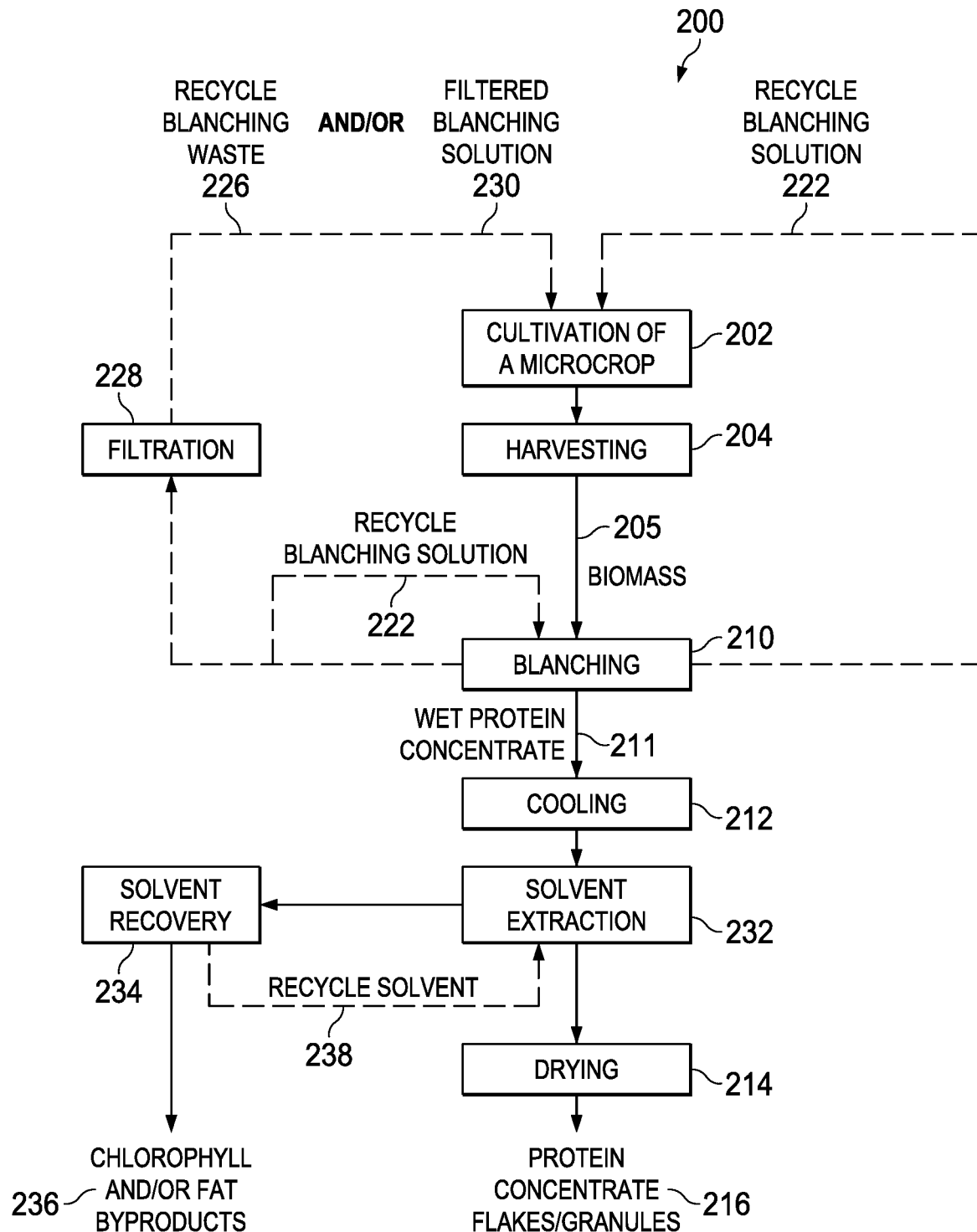
FIG. 2B is a flow diagram illustrating a system for cultivating, harvesting, and processing a microcrop for the production of high-concentration protein product according to a specific example embodiment of the disclosure.
Figure 2C:
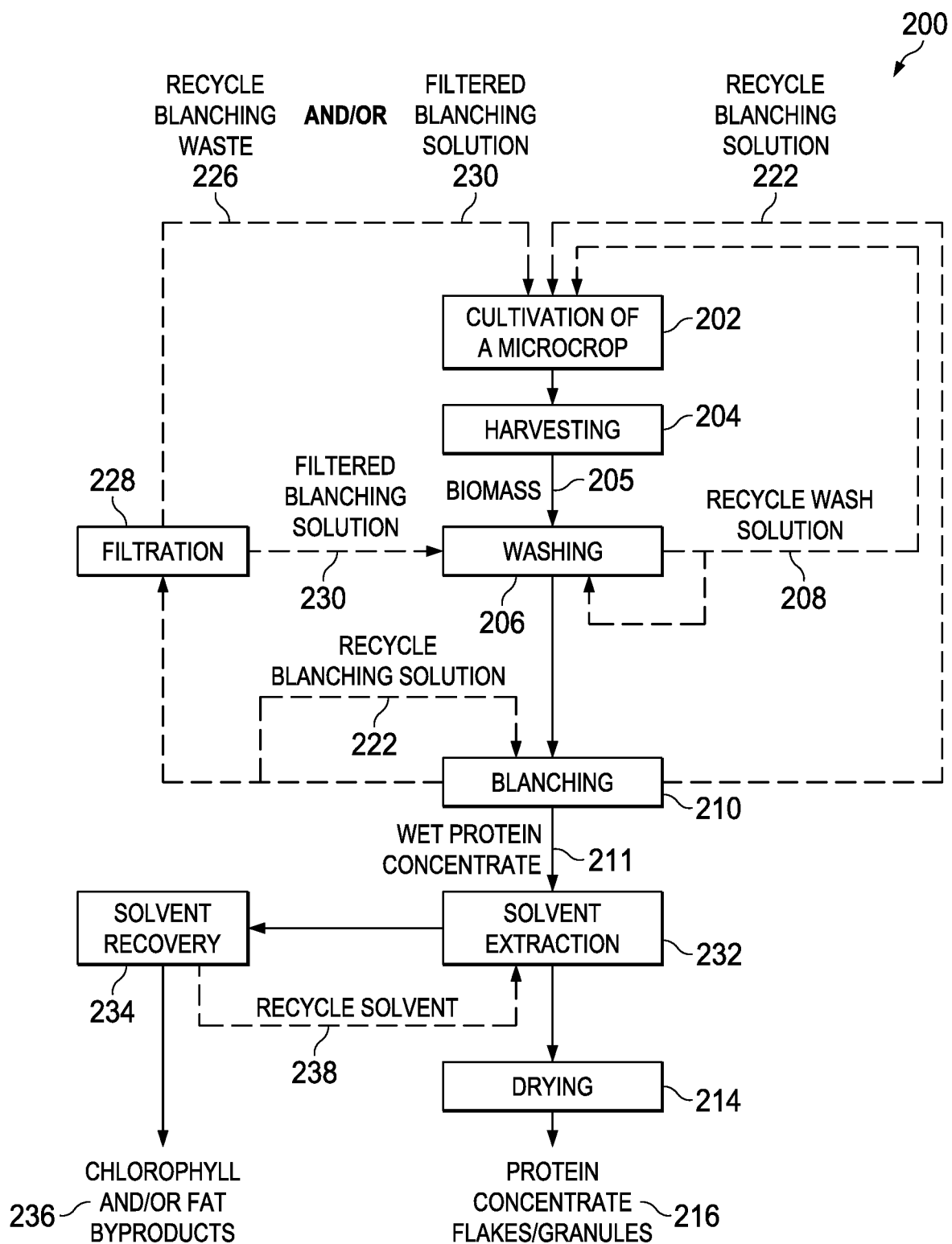
FIG. 2C is a flow diagram illustrating a system for cultivating, harvesting, and processing a microcrop for the production of high-concentration protein product according to a specific example embodiment of the disclosure.
Figure 2D:
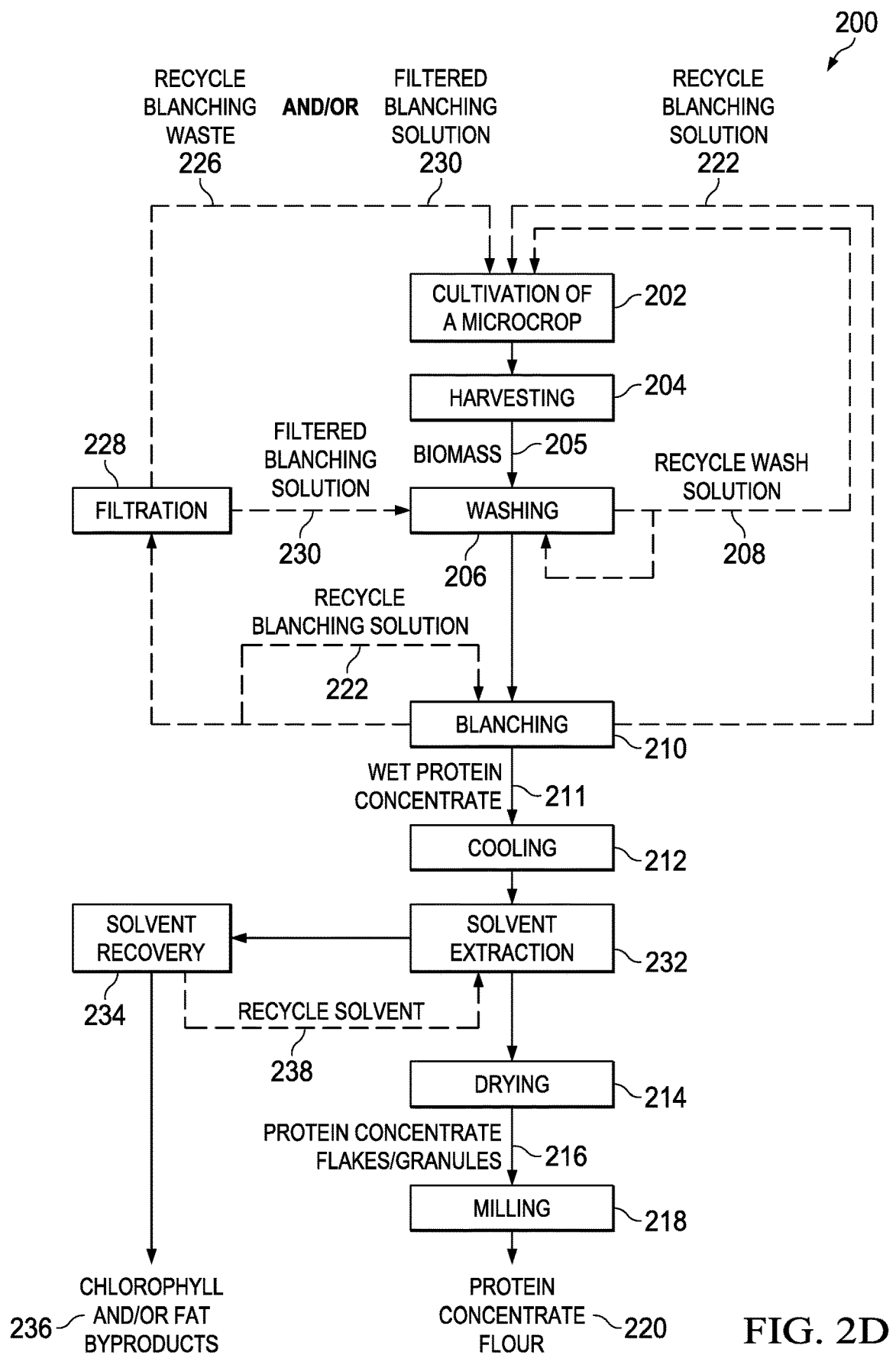
FIG. 2D is a flow diagram illustrating a system for cultivating, harvesting, and processing a microcrop for the production of high-concentration protein product according to a specific example embodiment of the disclosure.

As shown in FIGS. 2C and 2D, a biomass 205 may go through a wash procedure 206 (e.g., submerging, spraying, slurry) to remove debris, contaminants, microorganisms, and/or toxins. In some embodiments a wash procedure may be performed by exposing (e.g., submerging, spraying) at least about one surface of a biomass to a wash solution (e.g., water, growth medium, antimicrobial solution). A wash solution (e.g., water, ozonated water), in some embodiments, may be combined with a biomass to form a slurry. According to some embodiments, multiple washes (e.g., a first wash solution, a second wash solution, a third wash solution) may be applied to a biomass. Some or all of a wash solution (e.g., a first, second, and/or third wash solution), in some embodiments, may be separated from a biomass (e.g., using an inclined screen or vibratory screen).

In some embodiments, some or all of a wash solution, second wash solution, and/or third wash solution may be collected and reused/recycled 208. By volume, at least about 40%, or at least about 50%, or at least about 60%, or at least about 70%, or at least about 80%, or at least about 90%, or at least about 95% of a wash solution, second wash solution, and/or third wash solution (e.g., water) separated from the biomass may be recycled for future use (e.g., recycled wash solution or used as growth medium in the bioreactor system 208), according to some embodiments.

As shown in FIGS. 2A through 2D, a biomass, either washed or unwashed, may be blanched 210 to form a wet protein concentrate 211. According to some embodiments, a blanching procedure may include immersing or submerging a biomass in a blanching solution at a ratio of a blanching solution to a biomass (w/w) of 10:1, or 9:1, or 8:1, or 7:1, or 6:1, or 5.5:1, or 5:1, or 4.5:1, or 4:1, or 3.5:1, or 3:1, or 2.5:1, or 2:1, or 1.5:1, or 1:1. A blanching solution may comprise water, distilled water, reverse osmosis, nanofiltered water, and/or recycled fluid, according to some embodiments. In some embodiments, a blanching solution may further comprise at least one calcium salt (e.g., calcium chloride, calcium acetate). A biomass may be blanched (e.g., immersed/submerged in a blanching solution) having a temperature above about 70° C., or above about 75° C., or above about 80° C., or above about 85° C., or above about 90° C., or above about 95° C., or above about 100° C. at the time of use for about 20 sec to about 40 sec, or about 30 sec to about 45 sec, or about 30 sec to about 1 min, or about 30 sec to about 1 min 30 sec, or about 30 sec to about 2 min, or about 30 sec to about 5 min, or about 1 min to about 5 min, or about 1 min to about 5 min, or about 1 min to about 10 min, or about 30 sec to about 10 min, where "about" may represent plus or minus 10%, according to some embodiments. According to some embodiments, a biomass may be blanched at about 85° C. for about 40 sec.

Some or all of a blanching solution may be separated from a wet protein concentrate for example using gravity separation, draining, an inclined screen, a vibratory screen, filtration, a decanter centrifuge, a belt press, a fan press, a rotary press, a screw press, a filter press, a finisher press, or any combination thereof. As shown in FIGS. 2A through 2D, a separated blanching solution may be collected and reused/recycled 222. Further, according to some embodiments, a separated blanching solution may be filtered 228 to form a filtered blanching solution 230 and a blanching waste. Filtration may include, according to some embodiments, course filtration (e.g., gravity filtration, vibratory screen filtration), fine filtration (e.g., microfiltration, ultrafiltration, nanofiltration, reverse osmosis filtration), or any combination thereof. As shown in FIGS. 2A through 2D, a filtered blanching solution may be recycled as a wash solution 230, as a growth medium in the cultivation of a microcrop 230, as a blanching solution (not shown), or any combination thereof. In some embodiments, a blanching waste (e.g., retentate from a filtration method) may be recycled as part of a growth medium (e.g., as a nutrient source) in a cultivation of a microcrop 226.

As shown in FIGS. 2B and 2D, a wet protein concentrate may be cooled 212, for example by exposing (e.g., submerging, spraying) at least one surface of a wet protein concentrate to a cooling solution (e.g., water) or exposing at least one surface of a wet protein concentrate to decreased air temperatures or convective cooling conditions (e.g., wind, air movement), in some embodiments. A cooling solution may have a temperature below room temperature (e.g., about 12° C.) at the time of use. A cooling solution, in some embodiments, may be combined with a wet protein concentrate (e.g., first portion, second portion) to form a slurry. A cooling solution may remain in contact with a wet protein concentrate for at least about 30 seconds, or at least about 1 min, or at least about 5 min, or at least about 10 min, or at least about 15 min, or at least about 20 min, or at least about 25 min, or at least about 30 min. Some or all of a cooling solution, in some embodiments, may be separated from a wet protein concentrate (e.g., using an inclined screen or vibratory screen).

As shown in FIGS. 2A through 2D, a wet protein concentrate 211 may be further processed by solvent extraction 232 to remove at least some of a chlorophyll component and/or fat content. Solvent extraction 232 may comprise exposing (e.g., submerging, spraying, dripping) at least one surface of the biomass or the wet protein concentrate to a solvent solution (e.g., ethanol, methanol, acetone). A solvent solution, in some embodiments, may be combined with a wet protein concentrate (e.g., first portion, second portion) to form a slurry. A solvent extraction procedure, in some embodiments, may include moving (e.g., agitating, stirring, propelling) at least a portion of a solvent solution at a specified time, intermittently, or continually. In some embodiments a solvent solution may include one or more alcohols (e.g., ethanol, methanol, propanol, isopropanol, glycerol), acetone, dichloromethane, ethyl acetate, hexane, ketones, or combinations thereof. According to some embodiments, a solvent extraction procedure may include exposing (e.g., submerging, spraying, dripping, slurry) at least one surface of a wet protein concentrate to a solvent solution for at least about 5 sec., about 15 sec., about 30 sec., about 45 sec., about 1 min., about 2 min., about 3 min., about 5 min., about 10 min., about 20 min., about 30 min., about 40 min., about 50 min., about 1 hour, about 2 hours, about 3 hours, about 4 hours, about 5 hours, about 6 hours, about 12 hours, or about 24 hours. After solvent extraction 232, a wet protein concentrate may be separated from a solvent solution and the solvent may be recovered 234 for reuse/recycling 238. Further, a chlorophyll and/or fat by product may be recovered 236 for further processing.

As shown in FIGS. 2A through 2D, a wet protein concentrate may be dried 214 to generate a protein concentrate flake or a protein concentrate granule 216 (e.g., first portion, second portion), according to some embodiments. A drying procedure may be performed using a mechanism including, for example, a drum dryer, a double drum dryer, flash dryer, a fluid-bed dryer, a convection dryer, an evaporator, or any combination thereof.

According to some embodiments, a protein concentrate flake/granule may be milled 218, as shown in FIGS. 2A and 2D, to form a protein concentrate flour 220. A milling procedure may involve a hammer mill, a pin mill, a vibrating mill, a fluid energy mill, or any combination thereof.

Product Compositions Comprising a High-Concentration Protein Product from a Microcrop Embodiments of this disclosure also provide for product compositions comprising at least one high-concentration protein product (e.g., protein concentrate flake/granule, protein concentrate flour) from a microcrop (e.g., *Lemna*, *Wolffia*). For example, a product composition may comprise a protein shake, a smoothie, a nutrition bar, an animal feed product, or other food stuffs.

According to some embodiments, a protein composition (e.g., shake) may comprise at least one high-concentration protein product (e.g., protein concentrate flake/granule, protein concentrate flour) and at least one medium (e.g., water, milk, granola). A medium, in some embodiments, may include any solid or liquid component which constitutes a primary ingredient of a protein composition on a wet mass basis (for liquids) or a dry mass basis (for solids). For example, a liquid medium may include water, milk, yogurt, almond milk, soy milk, coconut water, rice milk, or any combination thereof, in some embodiments. A solid medium, in some embodiments, may include granola, oats, nuts, puffed rice, dough, or any combination thereof.

According to some embodiments, a protein composition may include at least one high-concentration protein product (e.g., protein concentrate flake/granule, protein concentrate flour), at least one medium (e.g., water, milk, granola), and at least one additive (e.g., sweetener). An additive, in some embodiments, may be any component capable of contributing to a taste (e.g., sweet, sour), a texture, and/or a nutritional content (e.g., vitamin or mineral supplements, a fat) of a protein composition. In some embodiments, an additive may include a sweetener (e.g., sugar, aspartame, honey, saccharin). An additive, in some embodiments, may include a hydrocolloidal stabilizer (e.g., lambda carrageenan, xanthan gum). In some embodiments, an additive may include a flavor, such as vanilla extract or almond extract.

According to some embodiments, an additive may comprise a nutritional component, for example, a fat (e.g., oils), a mineral source, a vitamin source, a dietary fiber source, or any combination thereof. Additives may be in any form (e.g., liquid, powder) or concentration without departing from the scope of the instant disclosure.

In some embodiments, a protein composition may comprise a protein shake including at least one high-concentration protein product (e.g., protein concentrate flake/granule, protein concentrate flour), at least one medium (e.g., water, milk), at least one flavor (e.g., chocolate, vanilla), and at least one sweetener (e.g., sugar, aspartame, saccharin). Table 4 depicts component ratios of a protein shake, according to one embodiment of the present disclosure.

TABLE 4

Example Protein Shake Medium to Protein Concentrate Ratios

| Component | Weight (g) | | | Medium/Component Ratio | | |
|---|---|---|---|---|---|---|
| | Low | Typical | High | Low | Typical | High |
| Medium | 100 | 100 | 100 | 1 | 1 | 1 |
| Protein concentrate | 0.5 | 6.5 | 15 | 200 | 15 | 7 |

In some embodiments, a protein composition may comprise a smoothie comprising at least one high-concentration protein product (e.g., protein concentrate flake/granule, protein concentrate flour), at least one hydrocolloidal stabilizer (e.g., lambda carrageenan, xanthan gum), at least one flavor (e.g., milk powder, chocolate, vanilla), at least one medium (e.g., water, milk), and at least one sweetener (e.g., sugar, aspartame, saccharin). Table 5 depicts component ratios of example compositions of a smoothie, according to some embodiments.

TABLE 5

Example Smoothie Compositions

| Component | Weight (g) | | | Medium/Component Ratio | | |
|---|---|---|---|---|---|---|
| | Low | Typical | High | Low | Typical | High |
| Medium | 100 | 100 | 100 | 1 | 1 | 1 |
| Protein concentrate | 0.5 | 6.5 | 15 | 200 | 15 | 7 |
| Lambda carrageenan | 0.023 | 0.3 | 0.692 | 4333 | 333 | 144 |
| Xanthan gum | 0.002 | 0.03 | 0.069 | 43333 | 3333 | 1444 |
| Rice milk Powder [2] | 0.115 | 1.5 | 3.462 | 867 | 67 | 29 |
| Sweetener | 0.154 | 2 | 4.615 | 650 | 50 | 22 |

In some embodiments, an animal feed may comprise a high-concentration protein concentrate (e.g., protein concentrate flake/granule, protein concentrate flour), at least one medium (e.g., water, milk), and multiple additives including at least one fat (e.g., oil), at least one fiber (e.g., hay), and at least one mineral (e.g., calcium, phosphorous, magnesium, salt). Table 6 depicts component ratios of an animal feed, according to example embodiments of the present disclosure.

TABLE 6

Animal Feed Component Ranges.

| Component | % of Composition (DMB) |
|---|---|
| Medium | 45-95 |
| Protein concentrate | 10-45 |
| Fat | 5-25 |
| Minerals | 1-5 |
| Dietary Fiber | 1-35 |

According to some embodiments, a food stuff may comprise a high-concentration protein concentrate (e.g., protein concentrate flake/granule, protein concentrate flour), at least one medium (e.g., water, milk) at least one fat (e.g., oil), at least one dietary fiber (e.g., non-starch polysaccharides), at least one sweetener (e.g., sugar, saccharine, aspartame), and at least one mineral (e.g., calcium, phosphorous, magnesium, salt). Table 7 depicts component ratios of example embodiments of a food stuff.

TABLE 7

Food stuff Component Ranges

| Component | % of Composition (DMB) |
|---|---|
| Medium | 45-95 |
| Protein concentrate | 10-55 |
| Fat | 5-40 |
| Minerals | 1-10 |
| Dietary Fiber | 1-20 |
| Sweetener | 1-15 |

Systems of Processing a High-Concentration Protein Product from a Microcrop

Embodiments of the disclosure also provide systems of processing a microcrop (e.g., aquatic species, *Lemna*) to yield a high-concentration protein product. Such systems may include, for example: a cultivation unit (e.g., 102) for growing a microcrop; a harvester unit (e.g., 104) for harvesting a microcrop to yield a biomass; a washing unit (e.g., 106); a blanching unit (e.g., 110) for blanching the biomass to form a wet protein concentrate; a first separating unit for separating the wet protein concentrate from a blanching solution; a second separating unit for separating a wet protein concentrate from a cooling solution; a dewatering unit for reducing a moisture content of a wet protein concentrate; a drying unit (e.g., 114/214) for drying a wet protein concentrate and/or a milled wet protein concentrate to generate a protein concentrate flake/granule; and a milling unit (e.g., 118) for milling a wet protein concentrate or protein concrete flakes/granules to generate a protein concentrate flour. Summarized in Table 8 are apparatuses that can be included in the units described above.

It is understood that the listed apparatuses for each unit are for illustration purposes only, and this is not intended to limit the scope of the application. A specific combination of these or other apparatuses or units can be configured in such a system for the intended use based on the teachings in the application.

Various changes may be made in the shape, size, number, separation characteristic, and/or arrangement of parts without departing from the scope of the instant disclosure. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Various changes may be made in methods of preparing and using a composition, device, and/or system of the disclosure without departing from the scope of the instant disclosure. Where desired, some embodiments of the disclosure may be practiced to the exclusion of other embodiments.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In some embodiments, the degree of flexibility may simply be a specific percentage of the disclosed end point (e.g., ±1% where tight control of end point values is desirable, ±10% where end point values are flexible and/or vary according to other parameters). In addition, it may be desirable, in some embodiments, to mix and match range endpoints. Also, in some embodiments, each figure disclosed (e.g., in one or more of the examples, tables, and/or drawings) may form the

TABLE 8

Example Apparatuses

| | |
|---|---|
| Cultivation unit (e.g., 102) | Bioreactor |
| Harvest unit (e.g., 104) | Skimmer, automatic harvester, manual harvester |
| Washing unit (e.g., 106) | Sprayer |
| Blanching Unit (e.g., 110) | Agitator, mixer, hot water bath, hot water spray, steam immersion system, shower unit, vibrating blanching tray |
| Cooling Unit (e.g., 112) | Chilled water bath, water bath, chilled water spray, cooling screw, chilled air |
| First Separating Unit | Inclined screen filter, vibratory screen filter, decanter centrifuge, belt press, fan press, rotary press, screw press, filter press, finisher press |
| Second Separating Unit | Inclined screen filter, vibratory screen filter, decanter centrifuge, belt press, fan press, rotary press, screw press, filter press, finisher press |
| Dewatering Unit (e.g., 114) | Rising film evaporator, falling film evaporator, natural circulation evaporator (vertical or horizontal), agitated-film evaporator, multiple-effect evaporator, vacuum evaporation apparatus, inclined screen filter, vibratory screen filter, decanter centrifuge, belt press, fan press, rotary press, screw press, filter press, finisher press |
| Solvent Extraction Unit | agitator, mixer, solvent extraction system (e.g., commercially available), column extraction system |
| Filtration Unit | Microfiltration unit, ultrafiltration unit, nanofiltration unit, reverse osmosis filtration unit, basket filtration unit |
| Drying Unit (e.g., 114/214) | Spray dryer, drum dryer, double drum dryer, flash dryer, fluid-bed dryer, convection dryer, evaporator |
| Milling Unit (e.g., 118/218) | Knife mill, hammer mill, pin mill, vibrating mill, jet mill fluid energy mill | basis of a range (e.g., depicted value+/−about 10%, depicted value+/−about 50%, depicted value+/−about 100%) and/or a range endpoint. With respect to the former, a value of 50 depicted in an example, table, and/or drawing may form the basis of a range of, for example, about 45 to about 55, about 25 to about 100, and/or about 0 to about 100. Unless otherwise designated within this disclosure, percentages as applied to concentrations are percentages on a dry mass basis (DMB).

These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

EXAMPLES

Some specific example embodiments of the disclosure may be illustrated by one or more of the examples provided herein.

Example 1: High-Protein Concentrate Product Extracted from Lemna

High-protein compositions were prepared with and without solvent extraction. Briefly, a wet protein concentrate was prepared by cultivating Lemna in a growth medium including water and nutrients. The microcrop was harvested and the biomass washed with a wash solution of chlorinated well water. The wash solution was removed by draining and compression of the biomass. The biomass was subjected to a blanching treatment wherein each 1 kg of washed biomass was combined with 3.5 L of a 65° C. blanching solution of distilled water and stirred constantly for 10 minutes thereby forming a wet protein concentrate. The wet protein concentrate was drained from the blanching solution and submerged in cold water, cold water was continuously poured over the wet protein concentrate until the concentrate reached room temperature. A first sample of the cooled wet protein concentrate was drained of excess water, frozen, and designated as a first high-protein composition without solvent extraction. A second sample of the cooled wet protein concentrate was subjected to a solvent extraction procedure wherein a 1 kg sample was combined with 1 L of ethanol (solvent solution) and incubated in a 100° C. water bath for 30 to 40 minutes. The solvent solution was drained from the wet protein concentrate and the solvent extraction protocol was repeated an addition four times. Between solvent extraction washes, extracted chlorophyll was removed from the wet protein concentrate by straining. After the final extraction, the wet protein concentrate was rinsed with water, drained, and frozen. This sample was designated as a second high-protein composition with solvent extraction.

An analysis of the composition of both the first and second high protein concentrates was performed by an external laboratory and the results are summarized in Tables 9 and 10.

TABLE 9

Composition of First High-Protein Product (without Solvent Extraction)

| Component | Dry Wt. % |
|---|---|
| Crude Protein | 64 |
| Ash | 12 |
| Fat | 7 |
| Crude Fiber | 5 |
| Carbohydrates | 12 |

TABLE 10

Composition of High-Protein Product with Solvent Extraction

| Component | Dry Wt. % |
|---|---|
| Crude Protein | 40 |
| Ash | 8 |
| Fat | 3 |
| Dietary Fiber | 6 |
| Carbohydrates | 43 |

Example 2: Blanching Conditions and Impact on Protein Content of High-Protein Concentrate Product from Lemna Protein concentration (DMB) was assessed for the impact of various blanching conditions. Briefly, a wet protein concentrate was prepared by cultivating Lemna in a growth medium including water and nutrients. The microcrop was harvested and the biomass washed with a wash solution of chlorinated well water. The wash solution was removed by draining and compression of the biomass. The biomass was subjected to various blanching treatments wherein for each 1 kg of washed biomass was combined with 3.5 L of a blanching solution of distilled water and stirred constantly for a specified period of time thereby forming a wet protein concentrate. The testing parameters included: (1) 60-65° C. for 5 min, (2) 60-65° C. for 10 min, (3) 60-65° C. for 15 min, (4) 70-75° C. for 5 min, (5) 70-75° C. for 5 min, (6) 70-75° C. for 10 min, (7) 70-75° C. for 15 min, (8) 80-85° C. for 5 min, (9) 80-85° C. for 10 min, (10) 80-85° C. for 15 min. The wet protein concentrate was drained from the blanching solution and submerged in cold water, cold water was continuously poured over the wet protein concentrate until the concentrate reached room temperature. A first sample of the cooled wet protein concentrate was drained of excess water, frozen, and designated as a first high-protein composition without solvent extraction. Results are shown in Table 11.

TABLE 11

Protein composition (% DMB) of High-Protein Concentrate Product

| Blanching Temperature | Time | | |
|---|---|---|---|
| | 5 min | 10 min | 15 min |
| 60° C.-65° C. | 52 | 30 | 43 |
| 70° C.-75° C. | 60 | 44 | 61 |
| 80° C.-85° C. | 66 | 59 | 45 |

Example 3: Batch Blanching Conditions and Impact on Protein Content of High-Protein Concentrate Product from Lemna Briefly, a wet protein concentrate was prepared by cultivating Lemna in a growth medium including water and nutrients. The microcrop was harvested and placed into a holding hopper. Samples of about 100-150 kg wet mass basis (WMB) were removed from the hopper and immersed in a tank containing 500 L of a blanching solution of well water at a starting temperature of 85-88° C. The sample was stirred within the tank in a manner that repeatedly submerged the floating *Lemna* sample in the blanching solution. Over a time period of 2 minutes, the temperature of the blanching solution within the tank decreased to between 76° C. and 78° C. After 2 minutes of submerging the sample, the sample was removed from the blanching solution and submerged in a cooling tank containing 1500 L of room temperature (about 23° C.) water. After a time period of 3 to 4 minutes, the temperature of the water in the cooling tank had increased to between 37° C. and 38° C. The *Lemna* sample was removed from the cooling tank and separated from the cooling solution by draining followed by a screw press. The dewatered *Lemna* sample was dried in a fluid bed dryer to form a high-concentration protein flake. A portion of the high-concentration protein flake sample was milled in a pin mill to generate a protein concentrate flour having an average particle size of about 120 μm.

Over 30 separate samples were processed by this method. A compositional analysis was performed on each high concentration protein flake sample and each protein concentrate flour sample. The typical amino acid profile of the samples is shown in Table 12. Typical composition characteristics of the high-concentration protein flake are shown in Table 13. In most of the samples tested, the oxalic acid concentration of was <0.25%. The average soluble polyphenol concentration of the samples was <3.2 mg/100 g. In most cases, the soluble polyphenol concentration was found to be below the detectable limits of the test. Table 14 depicts a nutritional profile of the processed *Lemna* samples.

TABLE 12

Amino Acid Profile of High-Protein Concentrate Product
Amino Acid Profile (g/100 g protein concentrate flake)

| | |
|---|---|
| Tryptophan | 2.1 |
| Alanine | 4.8 |
| Arginine | 5.7 |
| Aspartic Acid | 7.8 |
| Glutamic Acid | 9.4 |
| Glycine | 4.1 |
| Histidine | 2.0 |
| Isoleucine | 4.4 |
| Leucine | 7.7 |
| Phenylalanine + Tyrosine | 8.8 |
| Proline | 3.9 |
| Serine | 3.4 |
| Threonine | 3.7 |
| Lysine | 6.0 |
| Valine | 5.3 |
| Cysteine + Methionine | 2.9 |

TABLE 13

Compositions of High-Concentration Protein Flake

| Characteristic | |
|---|---|
| Solids (DMB) | ~92 |
| Moisture (DMB) | <8 |
| Protein (DMB) | 45-50 |
| PDCASS | 0.93 |
| Digestibility | ≥90 |
| Fat (DMB) | ≤7 |
| Ash (DMB) | <10 |

TABLE 13-continued

Compositions of High-Concentration Protein Flake

| Characteristic | |
|---|---|
| Dietary Fiber (DMB) | 35-45 |
| Oxalic acid | ≤1 |

TABLE 14

Average Nutritional profile of a processed *Lemna* sample

| TRAIT | UNIT | (per 100 g) | DMB % |
|---|---|---|---|
| Moisture | % | 2.77 | |
| Ash | % | 6.18 | 6.4% |
| Calories | Kcal | 449 | |
| Calories From Fat | | 69.30 | |
| Protein | % | 48.05 | 49.4% |
| Carbohydrates | % | 46.9 | 48.2% |
| Dietary Fiber | % | 39.85 | 41.0% |
| Sugars | % | 0 | 0.0% |
| Total Fat (AH) | % | 7.70 | 7.9% |
| Total Fat Acid Content | % | 6.99 | 7.2% |
| Saturated Fat | % | 1.51 | 1.6% |
| Monounsaturated | % | 0.15 | 0.2% |
| Polyunsaturated | % | 4.79 | 4.9% |
| Trans Fat | % | 0.23 | 0.2% |
| Cholesterol | mg/100 g | 0.84 | |
| Sodium | mg/100 g | 133 | |
| Vitamin A (B-Carotene) | IU/100 g | 56200 | |
| Vitamin C | mg/100 g | | |
| Calcium | mg/100 g | 1300 | |
| Iron | mg/100 g | 37 | |
| Vitamin E | IU/100 g | 12 | |
| Thiamine (B1) | mg/100 g | 0.03 | |
| Riboflavin (B2) | mg/100 g | 0.65 | |
| Niacin (B3) | mg/100 g | 0.537 | |
| Pantothenic acid (B5) | mg/100 g | 0.02 | |
| Vitamin B6 | mg/100 g | 0.275 | |
| Folic acid (B9) | mg/100 g | 229.91 | |
| Potassium | mg/100 g | 54.1 | |

| TRAIT | UNIT | (per 100 g) | % DMB |
|---|---|---|---|
| Magnesium | mg/100 g | 343 | |
| Zinc | mg/100 g | 10.3 | |
| Copper | mg/100 g | <1 | |
| Manganese | mg/100 g | 39.7 | |
| Phosphorus | mg/100 g | 640 | |
| Aluminum | ppm | 2.656 | |
| Boron | ppm | 643.797 | |
| Barium | ppm | 1.365 | |
| Cobalt | ppm | 0.01 | |
| Chromium | ppm | 0.296 | |
| Molybdenum | ppm | 0.53 | |
| Nickel | ppm | 0.1 | |
| Selenium | ppm | 0.01 | |
| Chlorophyll | mg/100 g | 540 | 0.56% |
| Lutein | mg/100 g | 38.5 | 0.0396% |
| Total polyphenols | mg GAE/kg | 3.244 | 0.0033% |

Example 4. Effect of Solvent Extraction of Blanched *Lemna* on Color and Composition of a High-Concentration Protein Product Briefly, a wet protein concentrate was prepared by cultivating *Lemna* in a growth medium including water and nutrients. The microcrop was harvested and placed into a holding hopper. Samples of about 100-150 kg wet mass basis (WMB) were removed from the hopper and immersed in a tank containing 500 L of a blanching solution of well water at a starting temperature of 85-88° C. The sample was stirred within the tank in a manner that repeatedly submerged the floating *Lemna* sample in the blanching solution. Over a time period of 2 minutes, the temperature of the blanching solution within the tank decreased to between 76° C. and 78° C. After 2 minutes of submerging the sample, the sample was removed from the blanching solution and submerged in a cooling tank containing 1500 L of room temperature (about 23° C.) water. After a time period of 3 to 4 minutes, the temperature of the water in the cooling tank had increased to between 37° C. and 38° C. The *Lemna* sample was removed from the cooling tank and separated from the cooling solution by draining. A 0.5 kg WMB portion of the blanched *Lemna* having a total solids content of about 10% was mixed at a 1:5 ratio with a solution of 80% to 90% ethanol at a temperature of 50° C. The ethanol slurry was stirred for about 30 minutes. The ethanol solution was separated from the blanched *Lemna* sample by filtration. The blanched *Lemna* sample was again combined at a 1:5 ratio with a solution of 80% to 90% ethanol at a temperature of 50° C., stirred for 30 minutes, and filtered to remove the ethanol solution. This process was repeated two additional times, such that the 1.5 kg sample of *Lemna* was extracted with an ethanol solution four times for a period of 30 minutes each. The *Lemna* sample was then portioned into three parts and each part was dried by a different method. A first part was dried by freeze drying, a second part was dried by vacuum, and a third part was dried by oven. A compositional analysis was performed, with the results being shown in Table 15.

TABLE 15. Compositional analysis of Solvent Extracted *Lemna* samples dried by various methods.

TABLE 15

Compositional analysis of Solvent Extracted *Lemna* samples dried by various methods.

| Sample | Protein % (DMB) | Fat % (DMB) | Ash % (DMB) |
| --- | --- | --- | --- |
| Control, non-extracted blanched *Lemna* | 45.45 | 7.79 | 5.2 |
| Extracted blanched *Lemna*, freeze dried | 53.84 | 1.22 | 4.75 |
| Extracted blanched *Lemna*, vacuum dried | 51.9 | <0.1 | 5.26 |
| Extracted blanched *Lemna*, oven dried | 52.57 | <0.1 | 5.11 |

Example 5: Effect of Solvent Extraction of a *Lemna* Sample Dewatered by Screw Pressing on Color and Composition of a High-Concentrate Protein Product Briefly, a wet protein concentrate was prepared by cultivating *Lemna* in a growth medium including water and nutrients. The microcrop was harvested and placed into a holding hopper. Samples of about 100-150 kg wet mass basis (WMB) were removed from the hopper and immersed in a tank containing 500 L of a blanching solution of well water at a starting temperature of 85-88° C. The sample was stirred within the tank in a manner that repeatedly submerged the floating *Lemna* sample in the blanching solution. Over a time period of 2 minutes, the temperature of the blanching solution within the tank decreased to between 76° C. and 78° C. After 2 minutes of submerging the sample, the sample was removed from the blanching solution and submerged in a cooling tank containing 1500 L of room temperature (about 23° C.) water. After a time period of 3 to 4 minutes, the temperature of the water in the cooling tank had increased to between 37° C. and 38° C. The *Lemna* sample was removed from the cooling tank and separated from the cooling solution by draining followed by a screw press. A 0.5 kg WMB portion of the blanched *Lemna* having a total solids content of about 10% was mixed at a 1:5 ratio with a solution of 80% to 90% ethanol at a temperature of 50° C. The ethanol slurry was stirred for about 30 minutes. The ethanol solution was separated from the blanched *Lemna* sample by filtration. The blanched *Lemna* sample was again combined at a 1:5 ratio with a solution of 80% to 90% ethanol at a temperature of 50° C., stirred for 30 minutes, and filtered to remove the ethanol solution. This process was repeated two additional times, such that the 1.5 kg sample of *Lemna* was extracted with an ethanol solution four times for a period of 30 minutes each.

Although some reduction in green color was observed, the decoloring of the high-concentration protein product was significantly less than the product generated in Example 4. Additional decoloring could be achieved by either longer solvent extraction times or additional cycles of solvent extraction.

Example 6: Determination of a Water and Fat Binding Capacity of a High-Concentration Protein Product To determine the water binding capacity of a high-concentration protein product derived from *Lemna*, a volume of water was added to 0.5 g of a high-concentrate protein product until the protein product could no longer absorb additional water, thus generating a slurry. The slurry was centrifuged at 3500 rpm for 5 minutes to form a centrifuge pellet. The centrifuge pellet was removed, weighed, and the supernatant was discarded. A water-binding capacity of the high-concentration protein product was determined to be 7.91 ml of water per gram of protein concentrate.

To determine a fat-binding capacity of a high-concentration protein product derived from *Lemna*, a volume of corn oil was added to 0.5 g of a high-concentrate protein product until the protein product could no longer absorb additional oil, thus generating a slurry. The slurry was then centrifuged at 3500 rpm for 5 minutes to form a centrifuge pellet. The centrifuge pellet was removed, weighed, and the supernatant was discarded. A fat-binding capacity of the high-concentrate protein product was determined to be 3.48 ml of corn oil/g of protein concentrate.

What is claimed is:
1. A method of processing a biomass comprising a microcrop, the method comprising:
   blanching the biomass in a blanching solution to form a blanched biomass;
   separating the blanched biomass from a separated solution;
   drying the blanched biomass to form at least one of a first protein concentrate flake and a first protein concentrate granule,
   wherein the microcrop comprises at least one of *Lemna* and *Wolffia*, and
   wherein at least one of the first protein concentrate flake and the first protein concentrate granule comprises at least 40% protein, a dietary fiber content of at least 20%, and a Protein Digestibility Corrected Amino Acid Score (PDCAAS) value of at least 0.90.
2. The method of claim 1, wherein the (PDCAAS) value is limited by histidine.

3. The method of claim 1, wherein a ratio of the blanching solution to the biomass is 7:1 (w/w), or 6:1 (w/w), or 5:1 (w/w), or (4:1 (w/w).

4. The method of claim 1, wherein the blanching the biomass in the blanching solution further comprises combining biomass and the blanching solution at a product flow rate ratio of 7:1.

5. The method of claim 1, wherein blanching the biomass in the blanching solution further comprises exposing the biomass to the blanching solution for less than 1 min.

6. The method of claim 5, wherein blanching the biomass in the blanching solution further comprises contacting at least one surface of the biomass with the blanching solution.

7. The method of claim 1, wherein blanching the biomass in the blanching solution comprises exposing the biomass to the blanching solution for about 45 sec.

8. The method of claim 1, wherein blanching the biomass in the blanching solution comprises exposing the biomass to the blanching solution for less than 2 min, wherein the blanching solution has a temperature between about 75° C. and 95° C.

9. The method of claim 1, wherein separating the blanched biomass from the separated solution is performed using a screw press.

10. The method of claim 1 further comprising milling at least one of the protein concentrate flake and the protein concentrate granule to form a protein concentrate flour.

11. The method of claim 1, further comprising solvent extracting the blanched biomass.

12. The method of claim 11, wherein separating the blanched biomass from the separated solution is performed using a vibratory screen.

13. The method of claim 1, further comprising washing the biomass with at least one of a first wash solution, a second wash solution, and a third wash solution, wherein the first wash solution, the second wash solution, and the third was solution are independently selected from a water, a recycled fluid, and an ozonated solution.

14. The method of claim 1, further comprising cooling the blanched biomass.

15. The method of claim 1, wherein the blanching solution comprises at least one calcium salt.

16. The method of claim 1 further comprising recycling the separated solution, wherein recycling the separated solution comprises at least one of:
diluting the separated solution;
filtering the separated solution; and
monitoring the separated solution.

17. The method of claim 16 further comprising:
blanching a second portion of the biomass in a blanching solution or a recycled blanching solution to form a second blanched biomass;
separating the second blanched biomass from the separated solution; and
drying the second blanched biomass to form at least one of a second protein concentrate flake and a second protein concentrate granule,
wherein at least one of the second protein concentrate flake and the second protein concentrate granule comprises at least 40% protein and a (PDCAAS) value of at least 0.90.

18. A high-concentration protein product generated by processing a biomass comprising a microcrop, the processing method comprising:
blanching the biomass in a blanching solution to form a blanched biomass;
separating the blanched biomass from a separated solution;
drying the blanched biomass to form the high-concentration protein product consisting of at least one of a first protein concentrate flake and a first protein concentrate granule,
wherein the microcrop comprises at least one of *Lemna* and *Wolffia*, and
wherein at least one of the first protein concentrate flake and the first protein concentrate granule comprises at least 40% protein, a dietary fiber content of at least 20%, and a Protein Digestibility Corrected Amino Acid score (PDCAAS) value of at least 0.90.

19. The high-concentration protein product of claim 18, wherein the (PDCAAS) value is limited by histidine.

20. The high-concentration protein product of claim 18, the method further comprising milling at least one of the a protein concentrate flake and the protein concentrate granule to form a protein concentrate flour.

21. The high-concentration protein product of claim 18, wherein at least one of the protein concentrate flake and the protein concentrate granule comprises at least one of:
a (PDCAAS) of at least 0.92,
a digestibility of at least 90%,
an ash content of less than 10% DMB,
a dietary fiber content of at least 30%,
an oxalic acid content of less than 1% DMB,
a polyphenol content of less of less than 3.2 mg/100 g,
a fat content of less than 7%,
a water-binding capacity of at least 7 ml/g, and
an oil-binding capacity of at least 3 ml/g.

22. The high-concentration protein product of claim 18, wherein the at least one of the protein concentrate flake and the protein concentrate granule comprises at least one of:
an oxalic acid content of less than 0.25% DMB and
a polyphenol content of less of less than 1.75 mg/100 g.

23. The high-concentration protein product of claim 18, wherein the method further comprises solvent extracting the blanched biomass.

24. The high-concentration protein product of claim 23, wherein separating the blanched biomass from the separated solution is performed using a vibratory screen.

25. The high-concentration protein product of claim 23, wherein at least one of the protein concentrate flake and the protein concentrate granule comprises at least one of:
a protein content of at least 45%,
a (PDCAAS) of at least 0.92,
a reduced chlorophyll concentration,
a digestibility of at least 90%,
an ash content of less than 10% DMB,
a dietary fiber content of at least 30%,
an oxalic acid content of less than 1% DMB,
a polyphenol content of less of less than 3.2 mg/100 g,
a fat content of less than 5%,
a water-binding capacity of at least 7 ml/g, and
an oil-binding capacity of at least 3 ml/g.

26. The high-concentration protein product of claim 23, wherein the at least one of the protein concentrate flake and the protein concentrate granule comprises at least one of:
an oxalic acid content of less than 0.25% DMB and
a polyphenol content of less of less than 1.75 mg/100 g.

27. A method of processing a biomass comprising a microcrop, the method comprising:
blanching the biomass in a blanching solution to form a blanched biomass;
separating the blanched biomass from a separated solution;

milling the blanched biomass to form a first milled wet protein concentrate;

drying the first milled wet protein concentrate to form a first dry milled protein concentrate;

wherein the microcrop comprises at least one of *Lemna* and *Wolffia*, and wherein the first dry milled protein concentrate comprises at least 40% protein, a dietary fiber content of at least 20%, and a Protein Digestibility Corrected Amino Acid Score (PDCAAS) value of at least 0.90.

28. The method of claim 27, wherein the (PDCAAS) value is limited by histidine.

29. The method of claim 27, wherein a ratio of the blanching solution to the biomass is 7:1 (w/w), or 6:1 (w/w), or 5:1 (w/w), or (4:1 (w/w).

30. The method of claim 27, wherein the blanching the biomass in the blanching solution further comprises combining the biomass and the blanching solution at a product flow rate ratio of 7:1.

31. The method of claim 27, wherein blanching the biomass in the blanching solution further comprises exposing the biomass to the blanching solution for less than 1 min.

32. The method of claim 31, wherein blanching the biomass in the blanching solution further comprises contacting at least one surface of the biomass with the blanching solution.

33. The method of claim 27, wherein blanching the biomass in the blanching solution comprises exposing the biomass to the blanching solution for about 45 sec.

34. The method of claim 27, wherein blanching the first portion of the biomass in the blanching solution comprises exposing biomass to the blanching solution for less than 2 min, wherein the blanching solution has a temperature between about 75° C. and 95° C.

35. The method of claim 27 further comprising solvent extracting the blanched biomass or the first milled wet protein concentrate.

36. The method of claim 35, wherein separating the blanched biomass from the separated solution is performed using a vibratory screen.

37. The method of claim 27 further comprising washing the biomass with at least one of a first wash solution, a second wash solution, and a third wash solution, wherein the first wash solution, the second wash solution, and the third was solution are independently selected from a water, a recycled fluid, and an ozonated solution.

38. The method of claim 27 further comprising cooling the blanched biomass.

39. The method of claim 27, wherein the blanching solution comprises at least one calcium salt.

40. The method of claim 27 further comprising recycling the separated solution, wherein recycling the separated solution comprises at least one of:

diluting the separated solution;

filtering the separated solution; and monitoring the separated solution.

41. The method of claim 40 further comprising:

blanching a second portion of the biomass in a blanching solution or a recycled blanching solution to form a second blanched biomass;

separating the second blanched biomass from the separated solution;

milling a second portion of the blanched biomass to form a second milled wet protein concentrate; and drying the second milled wet protein concentrate to form a second dry milled protein concentrate;

wherein the second dry milled protein concentrate comprises at least 40% protein and a (PDCAAS) value of at least 0.90.

* * * * *